United States Patent
Ng et al.

(10) Patent No.: US 10,091,659 B2
(45) Date of Patent: Oct. 2, 2018

(54) METHODS AND APPARATUS FOR PARTIAL SUBFRAME TRANSMISSION AND BROADCAST CHANNEL ON UNLICENSED SPECTRUM IN A LICENSED ASSISTED ACCESS (LAA) CELL

(71) Applicant: Samsung Electronics Co., Ltd, Suwon-si (KR)

(72) Inventors: Boon Loong Ng, Plano, TX (US); Thomas David Novlan, Dallas, TX (US)

(73) Assignee: Samsung Electronics Co., Ltd., Suwon-Si (KR)

( * ) Notice: Subject to any disclaimer, the term of this patent is extended or adjusted under 35 U.S.C. 154(b) by 0 days.

(21) Appl. No.: 15/146,859

(22) Filed: May 4, 2016

(65) Prior Publication Data
US 2017/0289818 A1    Oct. 5, 2017

Related U.S. Application Data

(60) Provisional application No. 62/159,050, filed on May 8, 2015, provisional application No. 62/190,619, filed on Jul. 9, 2015, provisional application No. 62/232,890, filed on Sep. 25, 2015, provisional application No. 62/237,511, filed on Oct. 5, 2015.

(51) Int. Cl.
| | |
|---|---|
| *H04W 16/14* | (2009.01) |
| *H04W 72/04* | (2009.01) |
| *H04W 48/12* | (2009.01) |
| *H04L 5/00* | (2006.01) |
| *H04L 27/26* | (2006.01) |

(52) U.S. Cl.
CPC .......... *H04W 16/14* (2013.01); *H04W 48/12* (2013.01); *H04W 72/042* (2013.01); *H04W 72/0446* (2013.01); *H04L 5/0053* (2013.01); *H04L 5/0092* (2013.01); *H04L 27/2662* (2013.01)

(58) Field of Classification Search
CPC . H04W 48/12; H04W 72/04; H04W 72/0446; H04W 72/042; H04W 16/14; H04L 27/2662; H04L 5/0053; H04L 5/0092
See application file for complete search history.

(56) References Cited

U.S. PATENT DOCUMENTS

2016/0065332 A1*    3/2016    Yum ................. H04W 72/1268
                                                                370/336

OTHER PUBLICATIONS

Media TeK Inc, "Design consideration on fractional subframe at the end of DL transmission" 3GPP Draft; France. pp. 7.*
LG Electronice, "Support of Partial PDSCH with LBT" 3GPP Draft; France 7 pages.*

(Continued)

*Primary Examiner* — Mewale Ambaye

(57) ABSTRACT

An apparatus for user equipment (UE). The UE comprises a transceiver configured to receive an indication of a partial subframe configuration over an unlicensed spectrum in a licensed assisted access (LAA) cell. The UE further includes at least one processor configured to determine a resource element (RE) mapping rule based on the indication of the partial subframe configuration; and identify an RE position of at least one reference signal to be received from the eNB based on the RE mapping rule.

14 Claims, 34 Drawing Sheets

(56) References Cited

OTHER PUBLICATIONS

3GPP TS 36.211 V12.3.0 Technical Specification 3rd Generation Partnership Project; Technical Specification Group Radio Access Network; Evolved Universal Terrestrial Radio Access (E-UTRA); Physical channels and modulation; Sep. 2014—124 Pages.

3GPP TS 36.212 V12.2.0 Technical Specification 3rd Generation Partnership Project; Technical Specification Group Radio Access Network; Evolved Universal Terrestrial Radio Access (E-UTRA); Multiplexing and channel coding; Sep. 2014—89 pages.

ETSI TS 136 213 v12.3.0 LTE; Evolved Universal Terrestrial Radio Access (E-Utra); Physical Layer Procedures (3GPP TS 36.213 version 12.3.0 Release 12—214 Pages.

3GPP TR 36.872 V12.1.0 Technical Report 3rd Generation Partnership Project; Technical Specification Group Radio Access Network; Small cell enhancements for E-UTRA and E-UTRAN—Physical layer aspects; Dec. 2013—100- Pages.

3GPP TS 36.133 V12.5.0 (Sep. 2014) Technical Specification 3rd Generation Partnership Project; Technical Specification Group Radio Access Network; Evolved Universal Terrestrial Radio Access (E-UTRA); Requirements for support of radio resource management; Sep. 2014—810 Pages.

3GPP TS 36.331 V12.3.0 (Sep. 2014) Technical Specification 3rd Generation Partnership Project; Technical Specification Group Radio Access Network; Evolved Universal Terrestrial Radio Access (E-UTRA); Radio Resource Control (RRC); Protocol specification; Sep. 2014—378 Pages.

ETSI EN 301 893 V1.7.1 (Jun. 2012) Broadband Radio Access Networks (BRAN); 5 GHz high performance RLAN; Harmonized EN covering the essential requirements of article 3.2 of the R&TTE Directive; Jun. 2012—90 Pages.

ZTE; "Design of Reservation Signal for LAA"; 3GPP TSG RAN WG1 Meeting #80bis; R1-151807; Belgrade, Serbia; Apr. 20-24, 2015; 5 pages.

Panasonic; "Indication of PDSCH in partial subframe"; 3GPP TSG RAN WG1 Meeting #80bis; Belgrade, Serbia; Apr. 20-24, 2015; 4 pages.

Partial Supplementary European Search Report for European Patent Application No. 16793283.9 dated May 2, 2018; 12 pages.

\* cited by examiner

METHODS AND APPARATUS FOR PARTIAL SUBFRAME TRANSMISSION AND BROADCAST CHANNEL ON UNLICENSED SPECTRUM IN A LICENSED ASSISTED ACCESS (LAA) CELL

CROSS-REFERENCE TO RELATED APPLICATION(S) AND CLAIM OF PRIORITY

This application claims priority under 35 U.S.C. § 119(e) to U.S. Provisional Patent Application No. 62/159,050 filed May 8, 2015 entitled "Methods and Apparatus for Partial TTI Transmission on Unlicensed Spectrum," U.S. Provisional Patent Application No. 62/190,619 filed Jul. 9, 2015 entitled "Methods and Apparatus for LTE Broadcast Channel on Unlicensed Spectrum," U.S. Provisional Patent Application No. 62/232,890 filed Sep. 25, 2015 entitled "Methods and Apparatus for Partial TTI Transmission on Unlicensed Spectrum" and U.S. Provisional Patent Application No. 62/237,511 filed Oct. 5, 2015 entitled "Methods and Apparatus for Partial TTI Transmission on Unlicensed Spectrum." The above-identified provisional patent application is hereby incorporated by reference in its entirety.

TECHNICAL FIELD

This disclosure relates generally to wireless communication systems. More specifically, this disclosure relates to method and apparatus for partial subframe transmission and broadcast channel on unlicensed spectrum.

BACKGROUND

A long term evolution (LTE) radio access technology (RAT) may be deployed on an unlicensed frequency spectrum, which is also known as licensed assisted access (LAA) or LTE unlicensed (LTE-U). One of possible deployment scenarios for the LAA is to deploy LAA carriers as a part of carrier aggregations, where an LAA carrier is aggregated with another carrier on a licensed frequency spectrum. In a conventional scheme, a carrier on a licensed frequency spectrum is assigned as a primary cell (PCell) and a carrier on an unlicensed frequency spectrum is assigned as a secondary cell (SCell) for a UE. Since there may be other RATs operating on the same unlicensed frequency spectrum as the LAA carrier, there is a need to enable co-existence of other RAT with LAA on an unlicensed frequency spectrum without undesirable interference between heterogeneous RATs.

SUMMARY

This disclosure provides methods and apparatus for partial subframe transmission and broadcast channel on unlicensed spectrum.

In one embodiment, a user equipment (UE) is provided. The UE includes a transceiver configured to receive an indication of a partial subframe configuration over an unlicensed spectrum in a licensed assisted access (LAA) cell. The UE further includes at least one processor configured to determine a resource element (RE) mapping rule based on the indication of the partial subframe configuration and identify an RE position of at least one reference signal to be received from the eNB based on the RE mapping rule.

In another embodiment, an eNodeB (eNB) is provided. The eNB includes a transceiver configured to transmit an indication of a partial subframe configuration over an unlicensed spectrum in a licensed assisted access (LAA) cell. The eNB further includes at least one processor configured to determine a resource element (RE) mapping rule based on the indication of the partial subframe configuration and identify an RE position of at least one reference signal to be transmitted to the UE based on the RE mapping rule.

In yet another embodiment, a user equipment (UE) is provided. The UE includes a transceiver configured to receive an indication of a bandwidth configuration of a licensed assisted access (LAA) cell over an unlicensed spectrum. The UE further includes at least one processor configured to determine a frequency location of an unlicensed physical broadcasting channel (U-PBCH) to be received from the eNB based on the indication of the bandwidth configuration.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of this disclosure and its advantages, reference is now made to the following description, taken in conjunction with the accompanying drawings, in which.

DETAILED DESCRIPTION

FIGS. 1 through 34, discussed below, and the various embodiments used to describe the principles of this disclosure in this patent document are by way of illustration only and should not be construed in any way to limit the scope of the disclosure. Those skilled in the art will understand that the principles of this disclosure may be implemented in any suitably arranged wireless communication system.

The following documents and standards descriptions are hereby incorporated by reference into the present disclosure as if fully set forth herein: 3GPP TS 36.211 v12.3.0, "E-UTRA, Physical channels and modulation" (REF1); 3GPP TS 36.212 v12.2.0, "E-UTRA, Multiplexing and Channel coding" (REF2); 3GPP TS 36.213 v12.3.0, "E-UTRA, Physical Layer Procedures" (REF3); 3GPP TR 36.872 v12.1.0, "Small cell enhancements for E-UTRA and E-UTRAN—Physical layer aspects" (REF4); 3GPP TS 36.133 v12.5.0, "E-UTRA, Requirements for support of radio resource management" (REF5); 3GPP TS 36.331 v12.3.0, "E-UTRA, Radio Resource Control (RRC) Protocol Specification" (REF6); and ETSI EN 301 893 v1.870 (2012-06), Harmonized European Standard, "Broadband Radio Access Networks (BRAN); 5 GHz high performance RLAN (REF7)."

Figure 1:
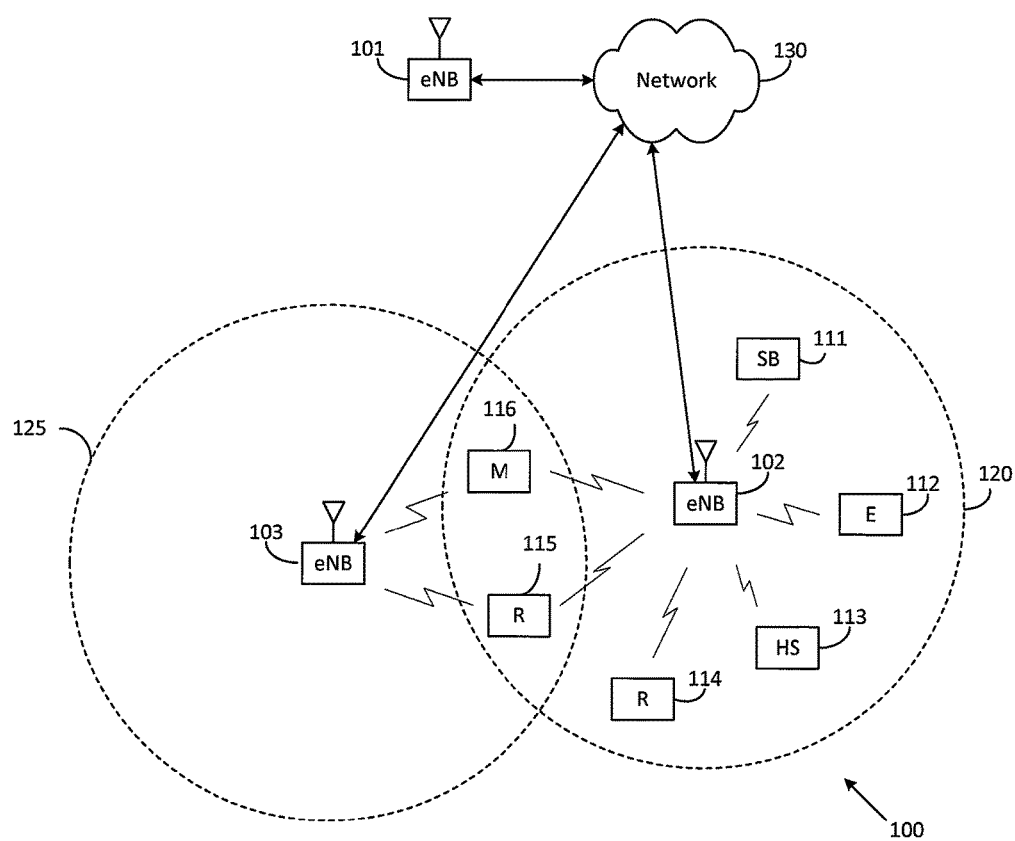
FIG. 1 illustrates an example wireless network according to embodiments of the present disclosure.
Figure 2:
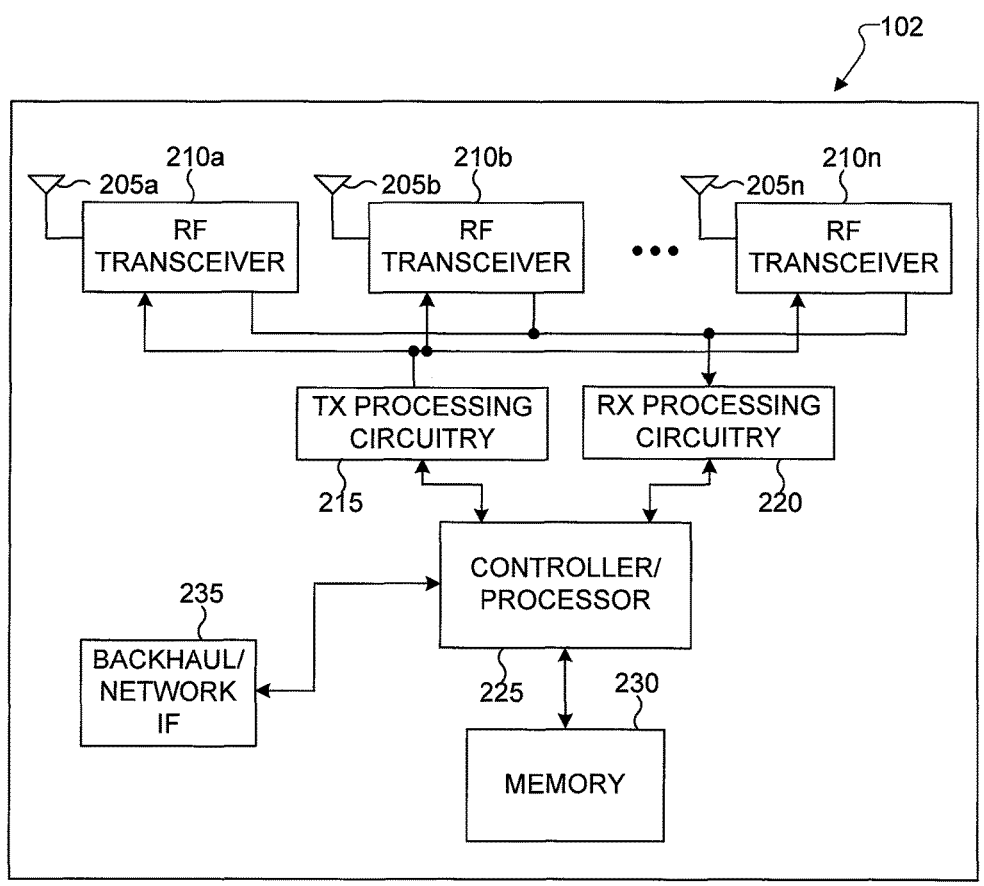
FIG. 2 illustrates an example eNodeB (eNB) according to embodiments of the present disclosure.
Figure 3:
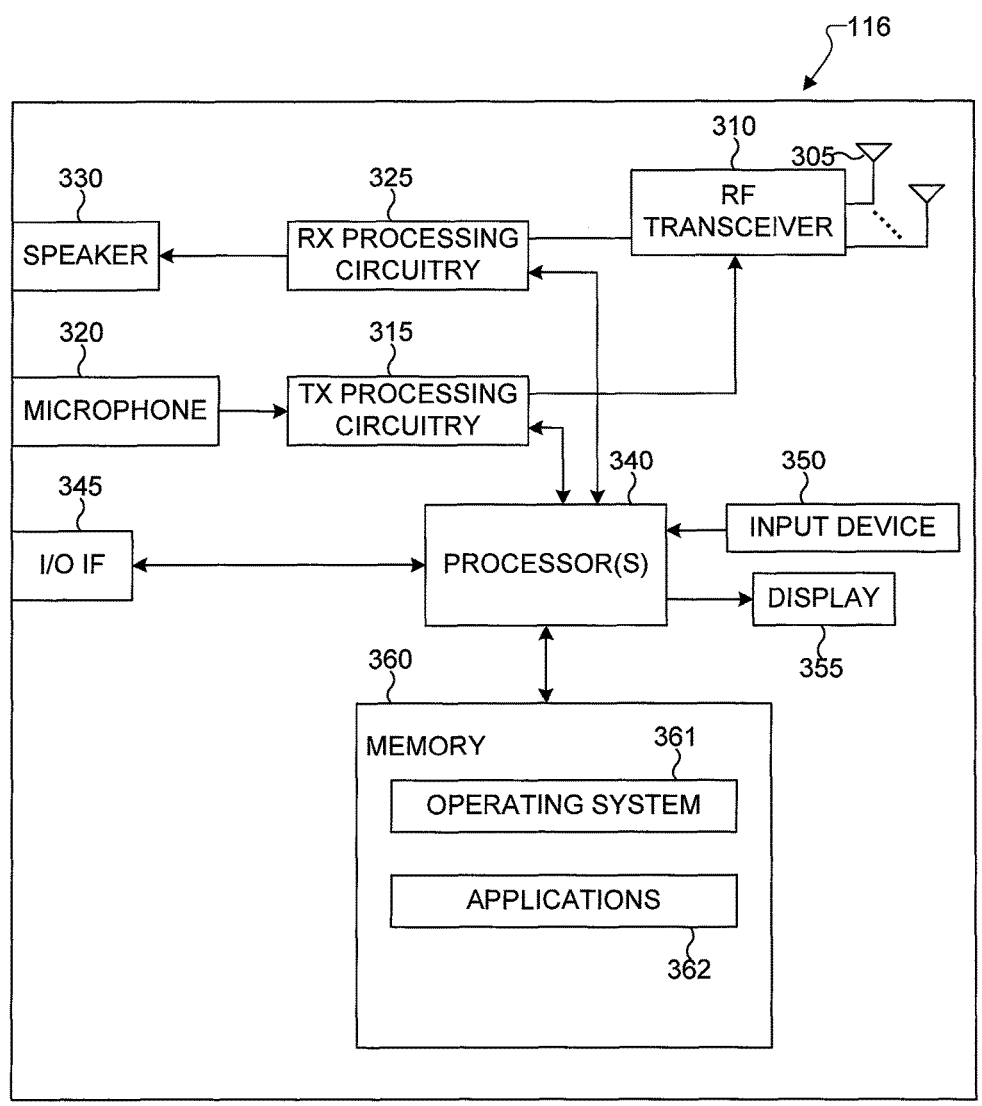
FIG. 3 illustrates an example user equipment (UE) according to embodiments of the present disclosure.

FIGS. 1-4B below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably-arranged communications system.

FIG. 1 illustrates an example wireless network 100 according to embodiments of the present disclosure. The embodiment of the wireless network 100 shown in FIG. 1 is for illustration only. Other embodiments of the wireless network 100 could be used without departing from the scope of this disclosure.

As shown in FIG. 1, the wireless network 100 includes an eNB 101, an eNB 102, and an eNB 103. The eNB 101 communicates with the eNB 102 and the eNB 103. The eNB 101 also communicates with at least one network 130, such as the Internet, a proprietary Internet Protocol (IP) network, or other data network.

The eNB 102 provides wireless broadband access to the network 130 for a first plurality of UEs within a coverage area 120 of the eNB 102. The first plurality of UEs includes a UE 111, which may be located in a small business (SB); a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M), such as a cell phone, a wireless laptop, a wireless PDA, or the like. The eNB 103 provides wireless broadband access to the network 130 for a second plurality of UEs within a coverage area 125 of the eNB 103. The second plurality of UEs includes the UE 115 and the UE 116. In some embodiments, one or more of the eNBs 101-103 may communicate with each other and with the UEs 111-116 using 5G, LTE, LTE-A, WiMAX, WiFi, LTE-U(LAA) or other wireless communication techniques.

Depending on the network type, other well-known terms may be used instead of "eNodeB" or "eNB," such as "base station" or "access point." For the sake of convenience, the terms "eNodeB" and "eNB" are used in this patent document to refer to network infrastructure components that provide wireless access to remote terminals. Also, depending on the network type, other well-known terms may be used instead of "user equipment" or "UE," such as "mobile station," "subscriber station," "remote terminal," "wireless terminal," or "user device." For the sake of convenience, the terms "user equipment" and "UE" are used in this patent document to refer to remote wireless equipment that wirelessly accesses an eNB, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with eNBs, such as the coverage areas 120 and 125, may have other shapes, including irregular shapes, depending upon the configuration of the eNBs and variations in the radio environment associated with natural and man-made obstructions.

As described in more detail below, one or more of the UEs 111-116 include circuitry, programming, or a combination thereof, for processing of a received reference signal based on a resource element (RE) mapping rule in accordance with the received indication of a partial subframe configuration over an unlicensed spectrum in a licensed assisted access (LAA) cell from the eNBs 101-103.

In some embodiments, the UEs 111-116 receive, from the eNBs 101-103, an indication of a partial subframe configuration over an unlicensed spectrum in a licensed assisted access (LAA) cell. In addition, the UEs 111-116 determine a resource element (RE) mapping rule based on the indication of the partial subframe configuration and identify an RE position of at least one reference signal to be received from the eNB based on the RE mapping rule.

In some embodiments, the UEs 111-116 identify a valid starting position of at least one orthogonal frequency division multiplexing (OFDM) symbol of a downlink transmission burst based on the indication of the partial subframe configuration. In such embodiments, the downlink transmission burst including the valid starting position of the at least one OFDM symbol that is configured by the indication of the partial subframe configuration comprises at least one of a physical downlink shared channel (PDSCH), an enhanced physical downlink control channel (EPDCCH), and a physical downlink control channel (PDCCH).

In some embodiments, the UEs 111-116 determine a set of valid starting and ending positions of at least one OFDM symbol of a downlink transmission burst based on the indication of the partial subframe configuration.

In some embodiments, the UEs 111-116 determine the RE position of the at least one reference signal based on the valid starting position of at least one OFDM symbol of a downlink transmission burst.

In some embodiments, the UEs 111-116 apply a first rule when the indication of the partial subframe configuration is received from the eNB and apply a second rule when the indication of the partial subframe configuration is not received from the eNB. In such embodiments, the indication of the partial subframe configuration is received from the eNB, the first rule comprises at least one RE mapping for the partial subframe in accordance with the non-MBSFN subframe structure regardless of whether a multicast broadcast single frequency network (MBSFN) subframe is configured for the partial subframe. In such embodiments, the at least one reference signal comprises a common reference signal (CRS) that is configured by the indication of the partial subframe configuration, the configured CRS mapping in accordance with non-MBSFN subframe structure.

In some embodiments, the UEs 111-116 receive an indication of a bandwidth configuration of a licensed assisted access (LAA) cell over an unlicensed spectrum. In such embodiments, the UEs 111-116 determine a frequency location of an unlicensed physical broadcasting channel (U-PBCH) to be received from the eNB based on the indication of the bandwidth configuration.

In some embodiments, the UEs 111-116 determine the frequency location of the U-PBCH using a blind detection of the U-PBCH. In some embodiments, the UEs 111-116 determine the frequency location of the U-PBCH using a blind detection of at least one reference signal to be received from the eNB. In some embodiments, the UEs 111-116 determine the frequency location of the U-PBCH based on at least one reference signal including bandwidth configuration information of the LAA cell.

In some embodiments, the eNBs 101-103 transmit an indication of a partial subframe configuration over an unlicensed spectrum in a licensed assisted access (LAA) cell, determine a resource element (RE) mapping rule based on the indication of the partial subframe configuration, and identify an RE position of at least one reference signal to be transmitted to the UE based on the RE mapping rule.

In some embodiments, the eNBs 101-103 identify a valid starting position of at least one orthogonal frequency division multiplexing (OFDM) symbol of a downlink transmission burst based on the indication of the partial subframe configuration. In such embodiments, the downlink transmission burst including the valid starting position of the at least one OFDM symbol that is configured by the indication of the partial subframe configuration comprises at least one of a physical downlink shared channel (PDSCH), an enhanced physical downlink control channel (EPDCCH), and a physical downlink control channel (PDCCH).

In some embodiments, the eNBs 101-103 determine a set of valid starting and ending positions of at least one OFDM symbol of a downlink transmission burst based on the indication of the partial subframe configuration.

In some embodiments, the eNBs 101-103 determine the RE position of the at least one reference signal based on the valid starting position of at least one OFDM symbol of a downlink transmission burst.

In some embodiments, the eNBs 101-103 apply a first rule when the indication of the partial subframe configuration is transmitted to the UE and apply a second rule when the indication of the partial subframe configuration is not transmitted to the UE. In such embodiments, when the indication of the partial subframe configuration is transmitted to the UE, the first rule comprises at least one RE mapping for the partial subframe in accordance with the non-MBSFN subframe structure regardless of whether a multicast broadcast single frequency network (MBSFN) subframe is configured for the partial subframe.

In some embodiments, the eNBs 101-103 comprises a common reference signal (CRS) that is configured by the indication of the partial subframe configuration, the configured CRS mapping in accordance with a non-MBSFN subframe structure.

Although FIG. 1 illustrates one example of a wireless network 100, various changes may be made to FIG. 1. For example, the wireless network 100 could include any number of eNBs and any number of UEs in any suitable arrangement. Also, the eNB 101 could communicate directly with any number of UEs and provide those UEs with wireless broadband access to the network 130. Similarly, each eNB 102-103 could communicate directly with the network 130 and provide UEs with direct wireless broadband access to the network 130. Further, the eNBs 101, 102, and/or 103 could provide access to other or additional external networks, such as external telephone networks or other types of data networks.

FIG. 2 illustrates an example eNB 102 according to embodiments of the present disclosure. The embodiment of the eNB 102 illustrated in FIG. 2 is for illustration only, and the eNBs 101 and 103 of FIG. 1 could have the same or similar configuration. However, eNBs come in a wide variety of configurations, and FIG. 2 does not limit the scope of this disclosure to any particular implementation of an eNB.

As shown in FIG. 2, the eNB 102 includes multiple antennas 205a-205n, multiple RF transceivers 210a-210n, transmit (TX) processing circuitry 215, and receive (RX) processing circuitry 220. The eNB 102 also includes a controller/processor 225, a memory 230, and a backhaul or network interface 235.

The RF transceivers 210a-210n receive, from the antennas 205a-205n, incoming RF signals, such as signals transmitted by UEs in the network 100. The RF transceivers 210a-210n down-convert the incoming RF signals to generate IF or baseband signals. The IF or baseband signals are sent to the RX processing circuitry 220, which generates processed baseband signals by filtering, decoding, and/or digitizing the baseband or IF signals. The RX processing circuitry 220 transmits the processed baseband signals to the controller/processor 225 for further processing.

The TX processing circuitry 215 receives analog or digital data (such as voice data, web data, e-mail, or interactive video game data) from the controller/processor 225. The TX processing circuitry 215 encodes, multiplexes, and/or digitizes the outgoing baseband data to generate processed baseband or IF signals. The RF transceivers 210a-210n receive the outgoing processed baseband or IF signals from the TX processing circuitry 215 and up-converts the baseband or IF signals to RF signals that are transmitted via the antennas 205a-205n.

In some embodiments, the RF transceivers 210a-210n are configured to transmit an indication of a partial subframe configuration over an unlicensed spectrum in a licensed assisted access (LAA) cell.

The controller/processor 225 can include one or more processors or other processing devices that control the overall operation of the eNB 102. For example, the controller/processor 225 could control the reception of forward channel signals and the transmission of reverse channel signals by the RF transceivers 210a-210n, the RX processing circuitry 220, and the TX processing circuitry 215 in accordance with well-known principles. The controller/processor 225 could support additional functions as well, such as more advanced wireless communication functions.

For instance, the controller/processor 225 could support beam forming or directional routing operations in which outgoing signals from multiple antennas 205a-205n are weighted differently to effectively steer the outgoing signals in a desired direction. Any of a wide variety of other functions could be supported in the eNB 102 by the controller/processor 225.

In some embodiments, the controller/processor 225 includes at least one microprocessor or microcontroller. In some embodiments, the controller/processor 225 is configured to determine a resource element (RE) mapping rule based on the indication of the partial subframe configuration and identify an RE position of at least one reference signal to be transmitted to the UE based on the RE mapping rule.

In some embodiments, the controller/processor 225 is configured to identify a valid starting position of at least one orthogonal frequency division multiplexing (OFDM) symbol of a downlink transmission burst based on the indication of the partial subframe configuration.

In some embodiments, the controller/processor 225 is configured to determine a set of valid starting and ending positions of at least one OFDM symbol of a downlink transmission burst based on the indication of the partial subframe configuration.

In some embodiments, the controller/processor 225 is configured to determine the RE position of the at least one reference signal based on the valid starting position of at least one OFDM symbol of a downlink transmission burst.

In some embodiments, the controller/processor 225 is configured to apply a first rule when the indication of the partial subframe configuration is transmitted to the UE and apply a second rule when the indication of the partial subframe configuration is not transmitted to the UE.

The controller/processor 225 is also capable of executing programs and other processes resident in the memory 230, such as an OS. The controller/processor 225 can move data into or out of the memory 230 as required by an executing process.

The controller/processor 225 is also coupled to the backhaul or network interface 235. The backhaul or network interface 235 allows the eNB 102 to communicate with other devices or systems over a backhaul connection or over a network. The interface 235 could support communications over any suitable wired or wireless connection(s). For example, when the eNB 102 is implemented as part of a cellular communication system (such as one supporting 5G, LTE, LTE-A, or LTE-U(LAA)), the interface 235 could allow the eNB 102 to communicate with other eNBs over a wired or wireless backhaul connection. When the eNB 102 is implemented as an access point, the interface 235 could allow the eNB 102 to communicate over a wired or wireless local area network or over a wired or wireless connection to a larger network (such as the Internet). The interface 235 includes any suitable structure supporting communications over a wired or wireless connection, such as an Ethernet or RF transceiver.

The memory 230 is coupled to the controller/processor 225. Part of the memory 230 could include a RAM, and another part of the memory 230 could include a flash memory or other ROM.

Although FIG. 2 illustrates one example of eNB 102, various changes may be made to FIG. 2. For example, the eNB 102 could include any number of each component shown in FIG. 2. As a particular example, an access point could include a number of interfaces 235, and the controller/processor 225 could support routing functions to route data between different network addresses. As another particular example, while shown as including a single instance of TX processing circuitry 215 and a single instance of RX processing circuitry 220, the eNB 102 could include multiple instances of each (such as one per RF transceiver). Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes a set of antennas 305, a radio frequency (RF) transceiver 310, TX processing circuitry 315, a microphone 320, and receive (RX) processing circuitry 325. The UE 116 also includes a speaker 330, a processor 340, an input/output (I/O) interface (IF) 345, an input device 350, a display 355, and a memory 360. The memory 360 includes an operating system (OS) 361 and one or more applications 362.

The RF transceiver 310 receives, from the set of antennas 305, an incoming RF signal transmitted by an eNB of the network 100. The RF transceiver 310 down-converts the incoming RF signal to generate an intermediate frequency (IF) or baseband signal.

In some embodiment, the RF transceiver 310 is configured receive an eNodeB (eNB), an indication of a partial subframe configuration over an unlicensed spectrum in a licensed assisted access (LAA) cell and an indication of a bandwidth configuration of a licensed assisted access (LAA) cell over an unlicensed spectrum.

The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS 361 stored in the memory 360 in order to control the overall operation of the UE 116. For example, the processor 340 could control the reception of forward channel signals and the transmission of reverse channel signals by the RF transceiver 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360.

In some embodiments, the processor 340 is configured to determine a resource element (RE) mapping rule based on the indication of the partial subframe configuration and identify an RE position of at least one reference signal to be received from the eNB based on the RE mapping rule.

In some embodiments, the processor 340 is configured to identify a valid starting position of at least one orthogonal frequency division multiplexing (OFDM) symbol of a downlink transmission burst based on the indication of the partial subframe configuration.

In some embodiments, the processor 340 is configured to determine a set of valid starting and ending positions of at least one OFDM symbol of a downlink transmission burst based on the indication of the partial subframe configuration.

In some embodiments, the processor 340 is configured to determine the RE position of the at least one reference signal based on the valid starting position of at least one OFDM symbol of a downlink transmission burst.

In some embodiments, the processor 340 is configured to apply a first rule when the indication of the partial subframe configuration is received from the eNB and apply a second rule when the indication of the partial subframe configuration is not received from the eNB.

The processor 340 can move data into or out of the memory 360 as required by an executing process. In some embodiments, the processor 340 is configured to execute the applications 362 based on the OS 361 or in response to signals received from eNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the input device 350 and the display 355. The operator of the UE 116 can use the input device 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). In another example, the UE 116 may include only one antenna 305 or any number of antennas 305. Also, while FIG. 3 illustrates the UE 116 configured as a mobile telephone or smartphone, UEs could be configured to operate as other types of mobile or stationary devices.

Figure 4A:
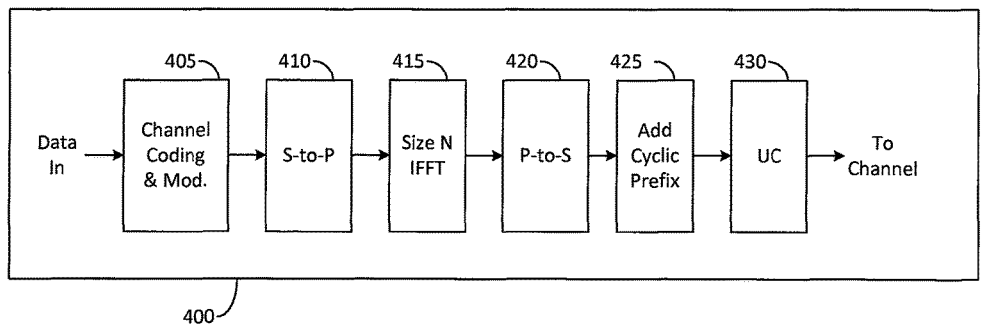
FIG. 4A illustrates a high-level diagram of an orthogonal frequency division multiple access transmit path according to embodiments of the present disclosure.
Figure 4B:
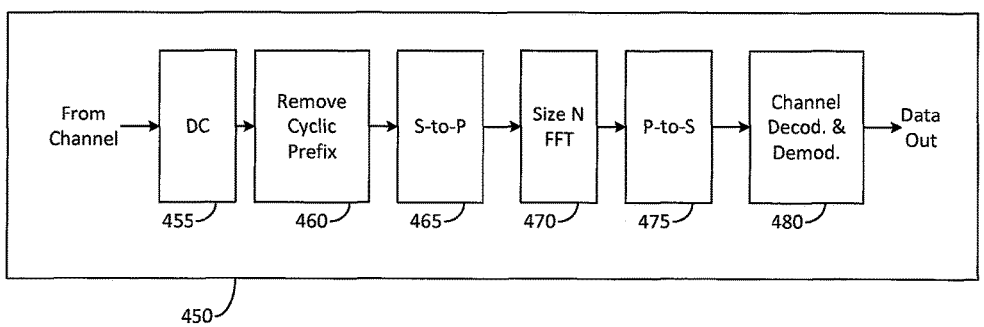
FIG. 4B illustrates a high-level diagram of an orthogonal frequency division multiple access receive path according to embodiments of the present disclosure.

FIG. 4A is a high-level diagram of transmit path circuitry 400. For example, the transmit path circuitry 400 may be used for an OFDMA communication. FIG. 4B is a high-level diagram of receive path circuitry 450. For example, the receive path circuitry 450 may be used for an OFDMA communication. In FIGS. 4A and 4B, for downlink communication, the transmit path circuitry 400 can be implemented in a base station (eNB) 102 or a relay station, and the receive path circuitry 450 may be implemented in a user equipment (such as user equipment 116 of FIG. 1). In other examples, for uplink communication, the receive path circuitry 450 can be implemented in a base station (such as 102 of FIG. 1) or a relay station, and the transmit path circuitry 400 can be implemented in a user equipment (such as user equipment 116 of FIG. 1).

Transmit path circuitry 400 comprises channel coding and modulation block 405, serial-to-parallel (S-to-P) block 410, Size N Inverse Fast Fourier Transform (IFFT) block 415, parallel-to-serial (P-to-S) block 420, add cyclic prefix block 425, and up-converter (UC) 430. Receive path circuitry 450 comprises down-converter (DC) 455, remove cyclic prefix block 460, serial-to-parallel (S-to-P) block 465, Size N Fast Fourier Transform (FFT) block 470, parallel-to-serial (P-to-S) block 475, and channel decoding and demodulation block 480.

At least some of the components in FIGS. 4A and 4B can be implemented in software, while other components can be implemented by configurable hardware or a mixture of software and configurable hardware. In particular, it is noted that the FFT blocks and the IFFT blocks described in this disclosure document can be implemented as configurable software algorithms, where the value of Size N can be modified according to the implementation.

In transmit path circuitry 400, channel coding and modulation block 405 receives a set of information bits, applies coding (such as low-density parity-check (LDPC) coding) and modulates (such as Quadrature Phase Shift Keying (QPSK) or Quadrature Amplitude Modulation (QAM)) the input bits to produce a sequence of frequency-domain modulation symbols. Serial-to-parallel block 410 converts (such as de-multiplexes) the serial modulated symbols to parallel data to produce N parallel symbol streams where N is the IFFT/FFT size used in BS 102 and UE 116. Size N IFFT block 415 then performs an IFFT operation on the N parallel symbol streams to produce time-domain output signals. Parallel-to-serial block 420 converts (such as multiplexes) the parallel time-domain output symbols from Size N IFFT block 415 to produce a serial time-domain signal. Add cyclic prefix block 425 then inserts a cyclic prefix to the time-domain signal. Finally, up-converter 430 modulates (such as up-converts) the output of add cyclic prefix block 425 to RF frequency for transmission via a wireless channel. The signal can also be filtered at baseband before conversion to RF frequency.

The transmitted RF signal arrives at UE 116 after passing through the wireless channel, and reverse operations to those at eNB 102 are performed. Down-converter 455 down-converts the received signal to baseband frequency, and remove cyclic prefix block 460 removes the cyclic prefix to produce the serial time-domain baseband signal. Serial-to-parallel block 465 converts the time-domain baseband signal to parallel time-domain signals. Size N FFT block 470 then performs an FFT algorithm to produce N parallel frequency-domain signals. Parallel-to-serial block 475 converts the parallel frequency-domain signals to a sequence of modulated data symbols. Channel decoding and demodulation block 480 demodulates and then decodes the modulated symbols to recover the original input data stream.

Each of eNBs 101-103 can implement a transmit path that is analogous to transmitting in the downlink to user equipment 111-116 and may implement a receive path that is analogous to receiving in the uplink from user equipment 111-116. Similarly, each one of user equipment 111-116 may implement a transmit path corresponding to the architecture for transmitting in the uplink to eNBs 101-103 and may implement a receive path corresponding to the architecture for receiving in the downlink from eNBs 101-103.

Figure 5A:
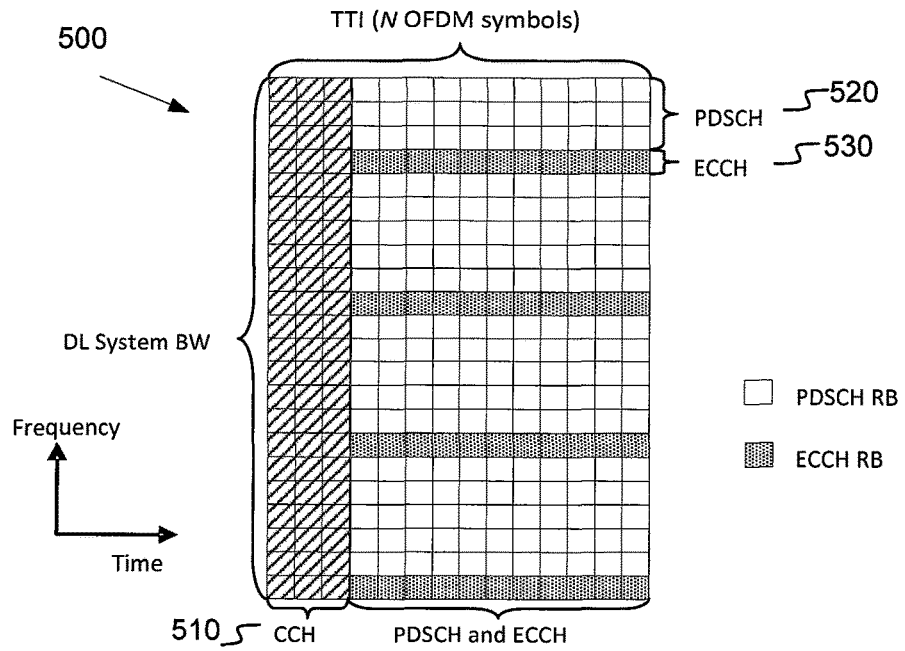
FIG. 5A illustrates an example structure for a downlink (DL) transmission time interval (TTI) according to embodiments of the present disclosure.

FIG. 5A illustrates an example structure for a DL TTI 500 according to embodiments of the present disclosure. An embodiment of the DL TTI structure 500 shown in FIG. 5 is for illustration only. Other embodiments can be used without departing from the scope of the present disclosure.

As illustrated in FIG. 5A, a DL signaling uses OFDM and a DL TTI includes N=14 OFDM symbols in the time domain and K resource blocks (RBs) in the frequency domain. A first type of control channels (CCHs) is transmitted in a first $N_1$ OFDM symbols 510 including no transmission, $N_1=0$. Remaining $N-N_1$ OFDM symbols are primarily used for transmitting PDSCHs 520 and, in some RBs of a TTI, for transmitting a second type of CCHs (ECCHs) 530.

An eNB 103 also transmits primary synchronization signals (PSS) and secondary synchronization signals (SSS), so that UE 116 synchronizes with the eNB 103 and performs cell identification. There are 504 unique physical-layer cell identities. The physical-layer cell identities are grouped into 168 unique physical-layer cell-identity groups which of each group contains three unique identities. The grouping is such that each physical-layer cell identity is part of one and only one physical-layer cell-identity group. A physical-layer cell identity $N_{ID}^{cell}=3N_{ID}^{(1)}+N_{ID}^{(2)}$ is thus uniquely defined by a number $N_{ID}^{(1)}$ in the range of 0 to 167, representing the physical-layer cell-identity group, and a number $N_{ID}^{(2)}$ in the range of 0 to 2, representing the physical-layer identity within the physical-layer cell-identity group. Detecting a PSS enables a UE 116 to determine the physical-layer identity as well as a slot timing of the cell transmitting the PSS. Detecting a SSS enables the UE 116 to determine a radio frame timing, the physical-layer cell identity, a cyclic prefix length as well as the cell uses ether a frequency division duplex (FDD) or a time division duplex (TDD) scheme.

Figure 5B:
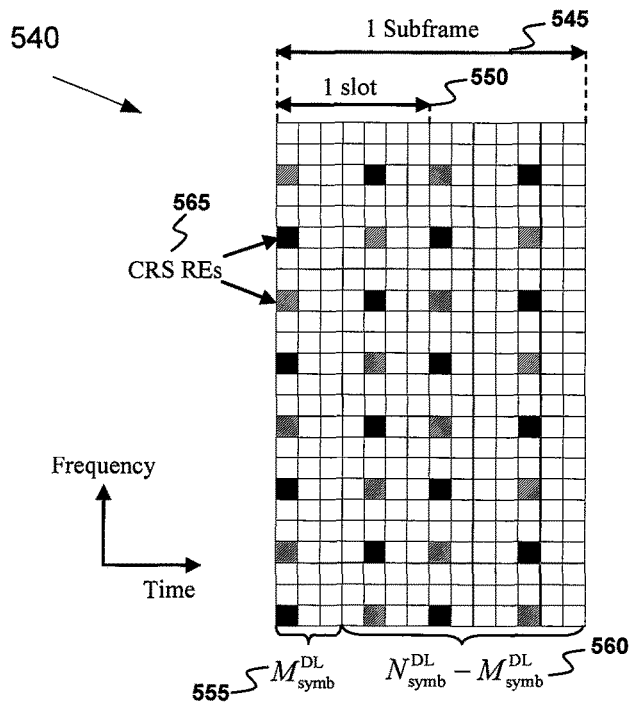
FIG. 5B illustrates an example structure for a common reference signal resource element (CRS RE) mapping according to embodiments of the present disclosure.

FIG. 5B illustrates an example structure for a CRS RE mapping 540 according to embodiments of the present disclosure. An embodiment of the CRS RE mapping 540 shown in FIG. 5B is for illustration only. Other embodiments may be used without departing from the scope of the present disclosure.

To assist cell search and synchronization, DL signals include synchronization signals such as a primary synchronization signal (PSS) and a secondary synchronization signal (SSS). Although having the same structure, the time-domain positions of the synchronization signals within a sub-frame 545 that includes at least one slot 550 differs depending on whether a cell is operating in frequency division duplex (FDD) or time division duplex (TDD). Therefore, after acquiring the synchronization signals, a UE determines whether a cell operates on the FDD or on the TDD, and a subframe index within a frame. The PSS and SSS occupy the central 72 sub-carriers, also referred to as resource elements (REs) 565, of an operating bandwidth. Additionally, the PSS and SSS inform of a physical cell identifier (PCID) for a cell and therefore, after acquiring the PSS and SSS, a UE knows the PCID of the transmitting cell.

Figure 6:
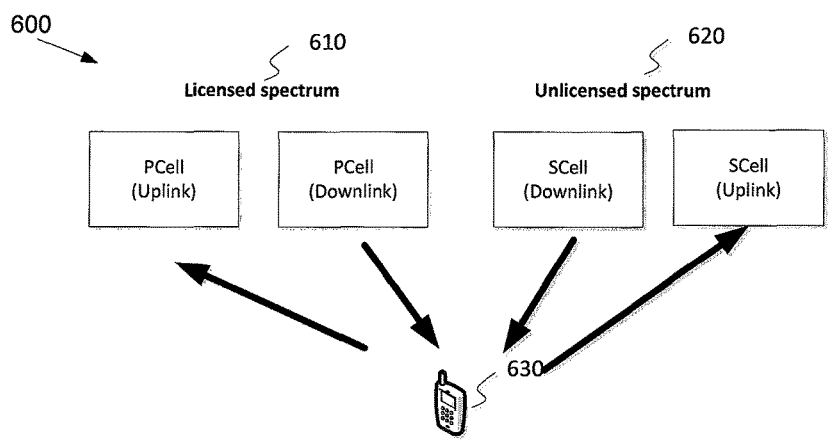
FIG. 6 illustrates an example carrier aggregation scheme on licensed and unlicensed spectrum according to embodiments of the present disclosure.

FIG. 6 illustrates an example carrier aggregation scheme on licensed and unlicensed spectrum 600 according to embodiments of the present disclosure. An embodiment of the carrier aggregation on licensed and unlicensed spectrum 600 shown in FIG. 6 is for illustration only. Other embodiments may be used without departing from the scope of the present disclosure.

A possible deployment scenario for LAA is to deploy an LAA carrier as a part of a carrier aggregation scheme, where the LAA carrier is aggregated with another carrier(s) on a licensed spectrum as illustrated in FIG. 6. In a conventional scheme, carrier(s) on the licensed spectrum 610 is assigned as a PCell and carrier(s) on the unlicensed spectrum 620 is assigned as a SCell for a UE 630. FIG. 6 shows an example where the LAA cell comprises of a downlink carrier with an uplink carrier. Since there may be other RATs operating on the same unlicensed frequency spectrum as the LAA carrier, there is a need to enable co-existence of other RAT with the LAA on an unlicensed frequency spectrum. A carrier sense multiple access (CSMA) may be applied, for example before a LE or an eNB transmits. In the CSMA operation, the UE or the eNB monitors a channel for a predetermined time period to determine whether there is an ongoing transmission in a channel. If no other transmission is sensed in the channel, the UE or the eNB may transmit data. If there is other transmission in the channel, the UE or the eNB postpones a transmission. Hereafter, the term LAA device may refer to an eNB or a UE operating on an LAA carrier.

Figure 7:
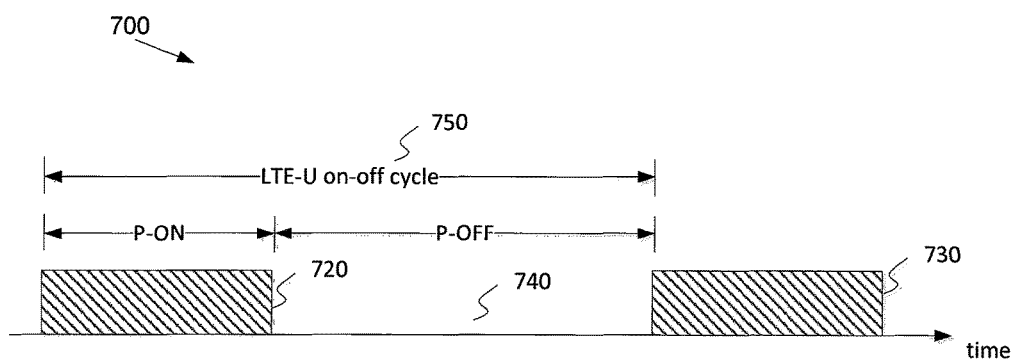
FIG. 7 illustrates an example time division multiplexing (TDM) transmission pattern of a long term evolution-unlicensed (LTE-U) downlink carrier according to embodiments of the present disclosure.

FIG. 7 illustrates an example TDM transmission pattern of an LTE-U downlink carrier 700 according to embodiments of the present disclosure. An embodiment of the TDM transmission pattern of an LTE-U downlink carrier 700 shown in FIG. 7 is for illustration only. Other embodiments may be used without departing from the scope of the present disclosure.

As illustrated in FIG. 7, an LAA carrier is ON (such as 720, 730) for a period P-ON and is OFF 740 for a period P-OFF. When the LAA carrier is ON, LTE signals are transmitted including at least one of a primary synchronization signal (PSS), a secondary synchronization signal (SSS), a common reference signal (CRS), a demodulation reference signal (DMRS), a physical downlink shared channel (PDSCH), a physical downlink control channel (PDCCH), an enhanced physical downlink common channel (EPDCCH), a channel status indication-reference signal (CSI-RS), or combinations thereof. However, when the LAA carrier is OFF, LTE signals are not transmitted.

The ON periods 720, 730 (or maximum channel occupancy time) have a maximum duration as defined by regulation (such as 10 ms). The length for P-ON periods 720, 730 are adjusted or adapted by the scheduler of the LAA according to a buffer status or a traffic pattern at the LAA carrier and a co-existence metric requirement or target. WiFi APs or other RAT transmitters utilizes the P-OFF period 740 for transmissions since the period 740 is free from LAA interference.

If a listen-before-talk (LBT) protocol is applied, there is an idle period after the end of channel occupancy (such as frame-based equipment). For example, a minimum idle period (such as 5%) of the channel occupancy is specified. The idle period includes a clear channel assessment (CCA) period towards the end of the idle period where carrier sensing is performed by a UE. The LBT protocol is defined for load-based equipment.

Discovery reference signals (DRS) or discovery Signals (DS) is transmitted by an LTE cell on an unlicensed spectrum. The DRS comprises physical signals such as PSS, SSS, CRS and CSI-RS, if configured. The purposes or functions of the DRS for the LTE cell on an unlicensed spectrum include, but are not limited to, discovery of the LTE cell, synchronization to the LTE cell, and RRM and CSI measurements of the LTE cell. Hereafter, the term LAA device refers to an eNB or a UE operating on a LAA carrier.

A network can configure a UE to measure multiple cells to generate signal quality measurements such as reference signal received power (RSRP) and/or reference signal received quality (RSRQ) of each cell for the purpose of radio resource management (RRM). Currently, a UE reports measurement results to a network when a reporting criterion is met, for example, a measurement reporting can be triggered when a RSRP/RSRQ value is greater than a threshold that can be configured by the network. This measurement framework can be very efficient since these measurements are based on the always-on transmission of channels and RS (e.g. DRS) utilized for channel measurement and corresponding reports. However, unlike for a licensed carrier, the assumptions of the availability of signals for these measurements need to be revisited considering LBT and other requirements on the unlicensed carrier.

One major difference from scenarios considered when designing DRS in Rel-12 of LTE system is that an LBT operation on unlicensed spectrum makes a strictly periodic transmission of DRS not always possible. Instead, the DRS could be transmitted 'on demand,' by a cell to increase the probability of successful transmission to meet RRM measurement performance requirements. Similar to a channel status indicator (CSI), a low duty cycle periodic DRS would be beneficial for LAA RRM to ensure sufficient and reliable measurement opportunities. However, it needs to be evaluated under what circumstances a UE may expect the transmission of the DRS, and whether it is periodically transmitted with a fixed interval or in an aperiodic manner, depending on the channel access mechanism.

An aspect related to how a network transmits discovery signals is what potential assistance info would be needed for UE to detect the discovery signal on unlicensed carriers. Extending DRS design to an LAA carrier, the network could utilize a configured DRS measurement timing configuration (DMTC) as an opportunistic detection/measurement window for a UE. In one example, during the measurement window the UE would need to detect whether a cell was able to successfully access the channel and transmit a DRS occasion. In such example, the probability of successful DRS transmission for intra/inter-frequency multi-cell discovery and measurement may be increased. There may be different alternatives for the transmission of DRS within a DMTC window if LBT is applied to DRS.

In some embodiments, DRS transmission may be used as the existing Rel-12 of LTE system for the DRS and DMTC occasions. Within every periodic DMTC occasion, the DRS is transmitted in the same fixed subframe. When an LBT is applied, an unlicensed carrier may be successfully acquired before a start of the DRS occasion, otherwise a cell does not transmit DRS.

Figure 8:
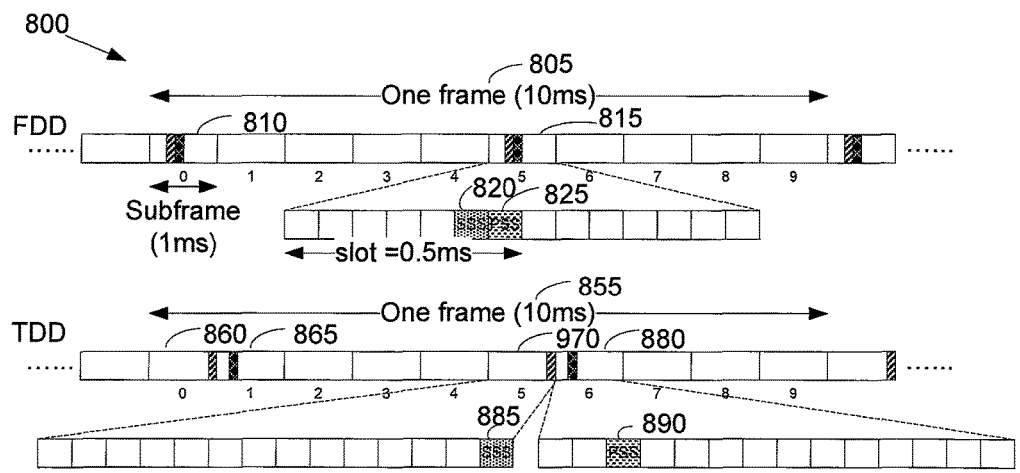
FIG. 8 illustrates an example configuration of time domain position for primary synchronization signal/secondary synchronization signal (PSS/SSS) according to embodiments of the present disclosure.

FIG. 8 illustrates an example configuration of time domain positions for PSS/SSS 800 according to embodiments of the present disclosure. An embodiment of the configuration of time domain positions for PSS/SSS 800 shown in FIG. 8 is for illustration only. Other embodiments can be used without departing from the scope of the present disclosure.

As illustrated in FIG. 8, in case of FDD, in every frame 805, a PSS 825 is transmitted within a last symbol of the first slot of subframes 0 and 5 (810 and 815), wherein a subframe includes two slots. A SSS 820 is transmitted within the second last symbol of the same slot. In case of TDD, in every frame 855, a PSS 890 is transmitted within the third symbol of subframes 1 and 6 (865 and 880), while a SSS 885 is transmitted in a last symbol of subframes 0 and 5 (860 and 870). The difference allows for the detection of the duplex scheme on a cell. The resource elements for the PSS and SSS are not available for transmissions of any other type of DL signals.

A DRS transmission instance by a cell is sometimes referred to in the following as a DRS occasion of the cell. The duration of a DRS occasion can be either fixed or configurable (e.g. by RRC) by the network. The duration (in unit of ms or subframes) can be 1, 2, 3, 4, or 5. The possible DRS occasion duration can also depend on the duplexing mode (e.g. for FDD), the duration can be 1 to 5 and for TDD, the duration can be 2 to 5. The physical signals and their corresponding RE mappings for a DRS occasion of 1 ms duration for FDD and 2 ms duration for TDD are may be configured.

Figure 9:
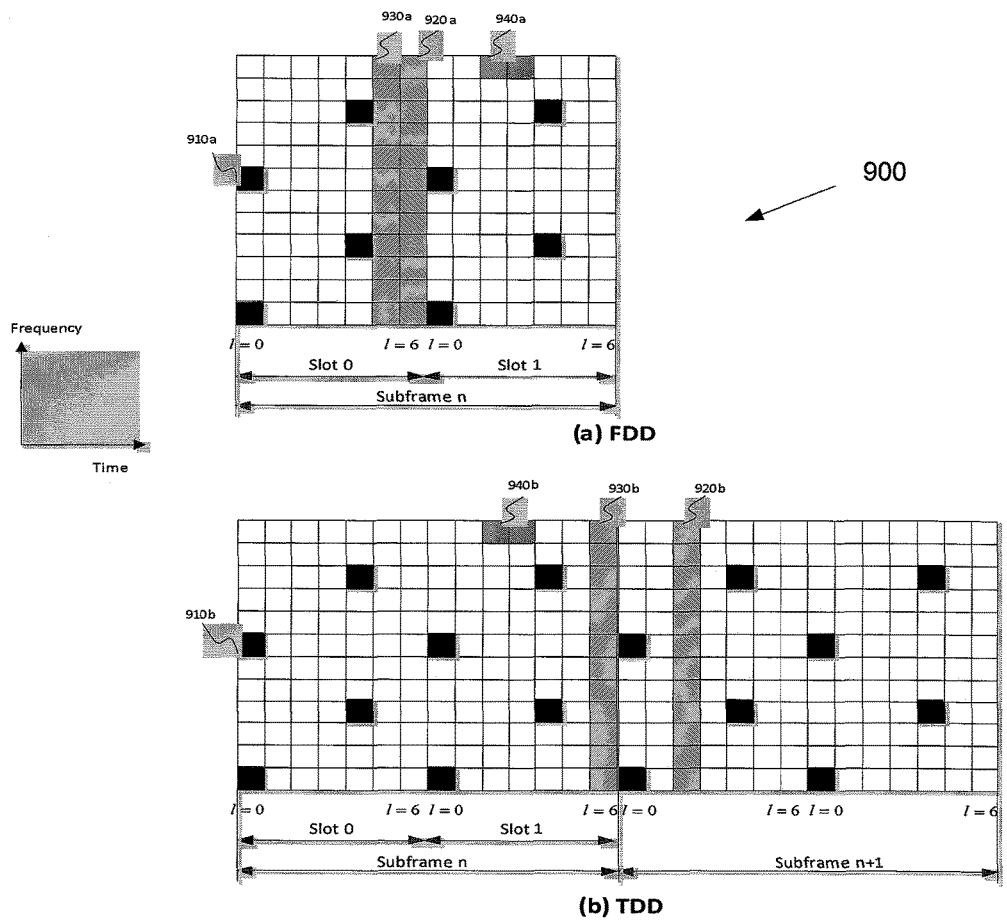
FIG. 9 illustrates an example discovery reference signal (DRS) occasion with duration of 1 millisecond (ms) for a frequency division duplexing (FDD) and 2 ms for a time division duplexing (TDD) according to embodiments of the present disclosure.

FIG. 9 illustrates an example DRS occasion with duration of 1 ms for a frequency division duplexing (FDD) and 2 ms for a time division duplexing (TDD) according to embodiments of the present disclosure. An embodiment of the DRS occasion 900 shown in FIG. 9 is for illustration only. Other embodiments can be used without departing from the scope of the present disclosure.

As illustrated in FIG. 9, a DRS occasion can include CRSs 910a, 910b (e.g. antenna port 0), PSSs 920a, 920b, SSSs 930a, 930b, and CSI-RSs 940a, 940b. The CSI-RSs 940a, 940b may only be present in the DRS occasion if the CSI-RSs 940a, 940b are configured. The location of the CSI-RS REs can be in any location allowed by the LTE specification or can be a new location designed for operation in an unlicensed carrier. Multiple CSI-RS resource can also be transmitted within the same DRS occasion and can be over multiple subframes. The second subframe of the DRS occasion for TDD can be a special subframe, in which case, CRS is only present in the DwPTS region of the subframe.

Figure 10:
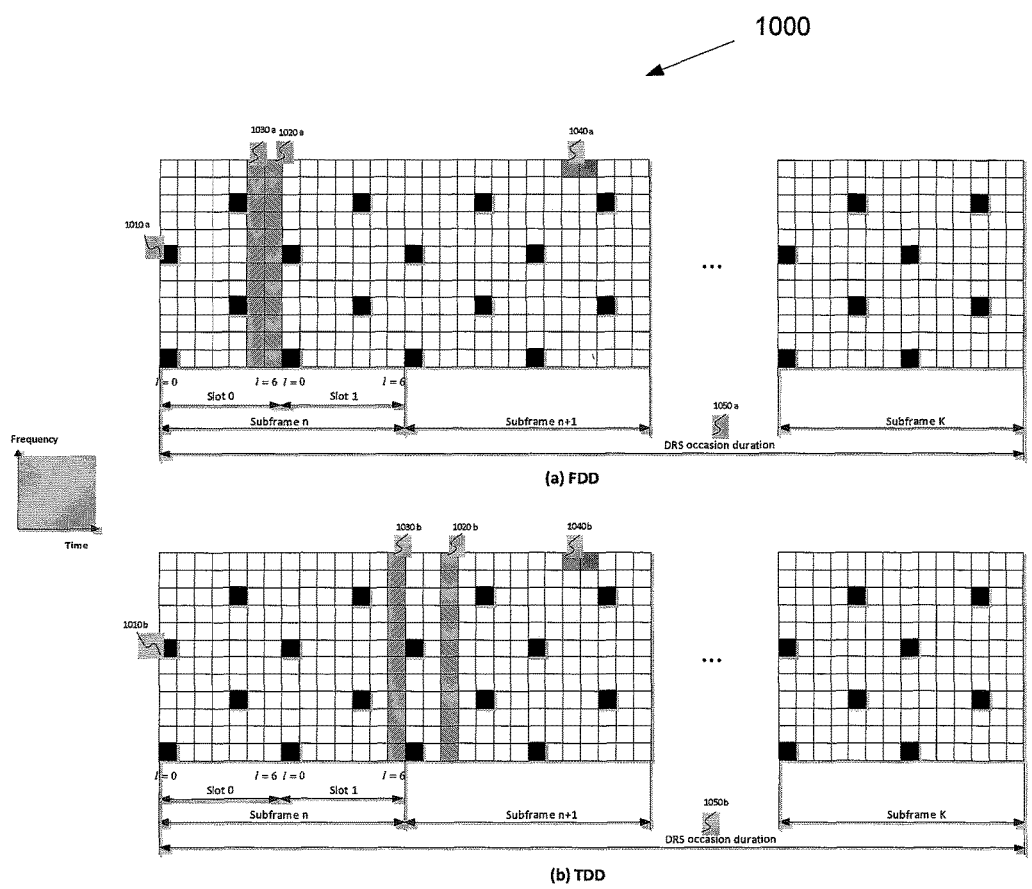
FIG. 10 illustrates an example DRS occasion with duration of K ms for an FDD and TDD according to embodiments of the present disclosure.

FIG. 10 illustrates an example DRS occasion with duration of K ms for an FDD and TDD according to embodiments of the present disclosure. An embodiment of the DRS occasion 1000 shown in FIG. 10 is for illustration only. Other embodiments can be used without departing from the scope of the present disclosure. As illustrated in FIG. 10, the DRS occasions may comprise duration of K ms (e.g. K≤5) for FDD and for TDD.

As illustrated in FIG. 10, CRSs 1010a, 1010b (e.g. antenna port 0) can be transmitted in all DL subframes and in DwPTS of special subframes. PSSs 1020a, 1020b and SSSs 1030a, 1030b are transmitted once over the DRS occasion duration and their locations within the DRS occasion can be fixed or configurable by a network. In one example of fixed PSS and SSS locations, the PSS and the SSS can be transmitted in the first subframe of the DRS occasion for FDD, whereas for TDD, the SSS and the PSS can be transmitted in the first and the second subframe of the DRS occasion, respectively. CSI-RSs 1040a, 1040b may only be present in a DRS occasion if the CSI-RS is configured.

A common reference signal (CRS) can be transmitted by an LAA cell in the beginning of a LAA DL transmission burst, at least for providing synchronization functionality for UEs. A CRS transmission and its RE mapping can depend on the starting OFDM symbol of physical downlink shared channel (PDSCH) and/or enhanced physical downlink control channel (EPDCCH) and/or PDCCH on an LAA cell. A PDSCH is used as an example in this disclosure for ease of exposition. However, other examples of physical channels can be used without departing from the scope of the present disclosure.

In some embodiments, if a first symbol (l=0) of slot 0 of a subframe is one of the valid starting OFDM symbols of PDCCH/EPDCCH/PDSCH, the CRS RE mapping can be according to a CRS RE mapping for a subframe as specified in LTE specification, or can be according to a new CRS RE mapping for an LAA cell.

Figure 11:
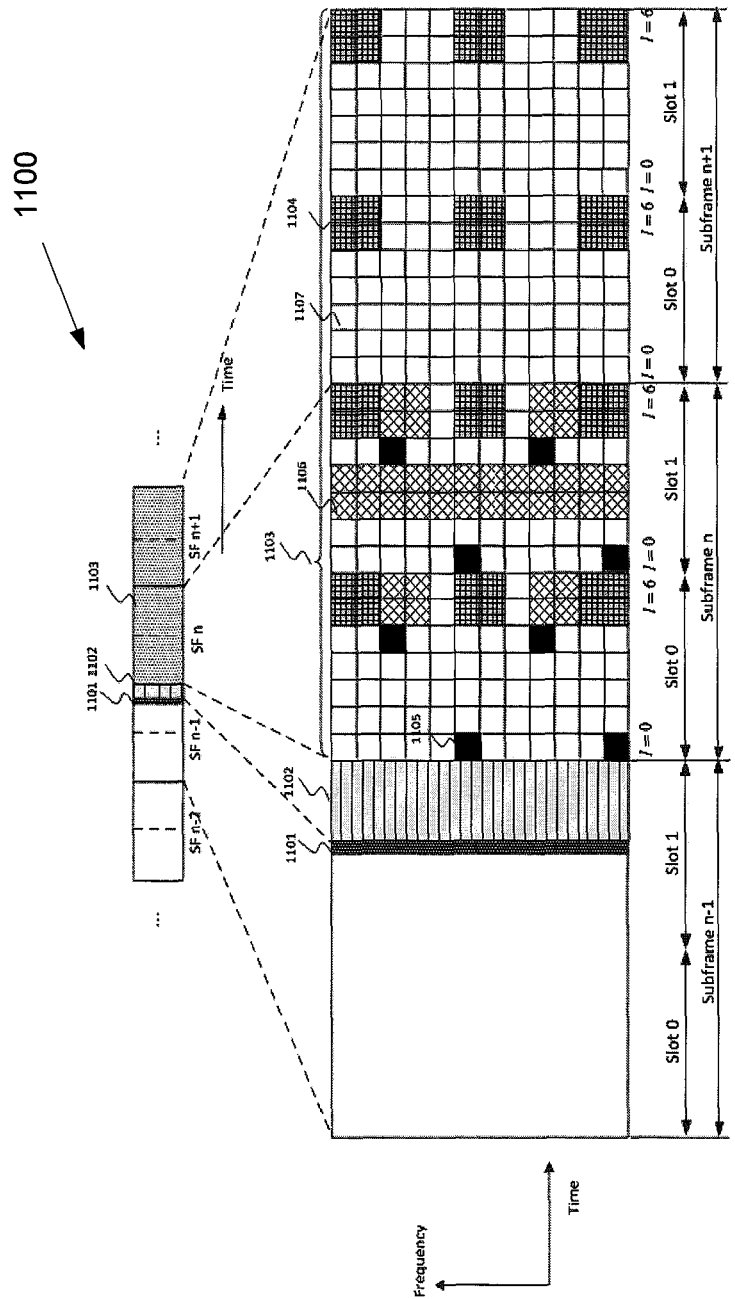
FIG. 11 illustrates an example reference signals resource element (RE) mapping for an enhanced physical downlink control channel/physical downlink shared channel (EPDCCH/PDSCH) starting symbol at l=0 of slot 0 according to embodiments of the present disclosure.

FIG. 11 illustrates an example reference signals resource element (RE) mapping for an physical downlink control channel/enhanced physical downlink control channel/physical downlink shared channel (PDCCH/EPDCCH/PDSCH) starting symbol at l=0 of slot 0 according to embodiments of the present disclosure. An embodiment of the reference signals RE mapping 1100 shown in FIG. 11 is for illustration only. Other embodiments can be used without departing from the scope of the present disclosure.

If a subframe is the first subframe of a DL transmission burst, it can be predefined or configurable that the CRS RE mapping for the subframe can be in accordance with mapping for non-MBSFN subframe or normal DL subframe (e.g. as in LTE specification) regardless of whether the subframe has been configured as an MBSFN subframe or not. If a PDSCH subframe immediately follows another PDSCH subframe, the CRS may not be transmitted for CRS overhead savings; alternatively, the CRS may be transmitted in at least the first OFDM symbol of the PDSCH subframe (e.g. as normal DL subframe (non-MBSFN subframe) or multi-cast-broadcast single frequency network (MBSFN) subframe e.g. according to network configuration or scheduling decision). In such embodiments, a minimum duration of an LAA DL transmission burst (e.g., control/data transmission, excluding possible initial signal such as reservation signal, PSS/SSS/CRS or other types of initial signal) can be defined to be one subframe.

As illustrated in FIG. 11, upon a successful CCA in subframe n−1 1101, an eNodeB can transmit a reservation signal or an initial signal 1102 until the first symbol (l=0) of slot 0 of subframe n, assuming that the first symbol is the first valid starting OFDM symbol. A PDSCH 1103 can be transmitted 1103 after reservation signal or initial signal. A CRS 1105 (e.g. port 0) can be transmitted in an OFDM symbol l=0, 4 of slot 0 and slot 1 in subframe n according to CRS RE mapping (or according to a new CRS RE mapping for the LAA cell). More than one CRS port (e.g., port 1, 2, 3) can also be transmitted. The CRS 1105 is not transmitted in a PDSCH subframe n+1 for CRS overhead savings.

Figure 12:
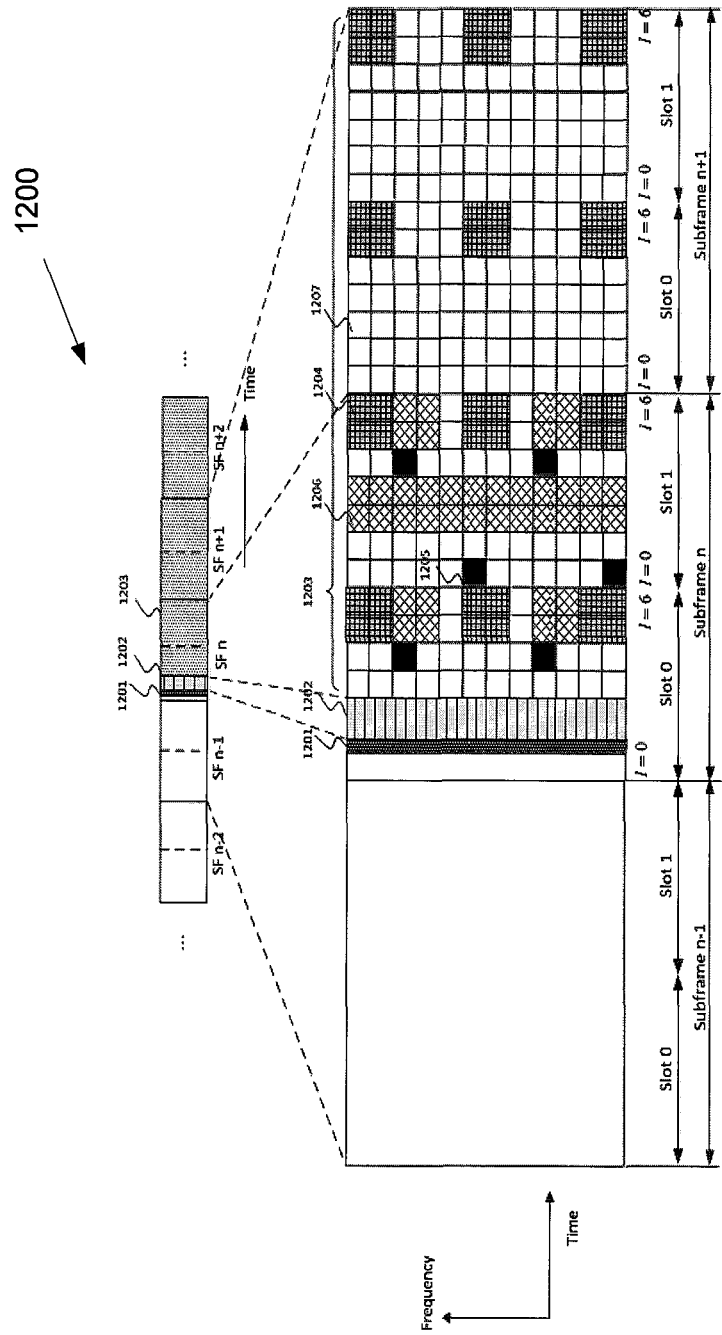
FIG. 12 illustrates an example reference signals RE mapping for an EPDCCH/PDSCH starting symbol at l=1, 2, 3 of slot 0 according to embodiments of the present disclosure.

FIG. 12 illustrates an example reference signals RE mapping for an EPDCCH/PDSCH starting symbol at l=1, 2, 3 of slot 0 according to embodiments of the present disclosure. An embodiment of the reference signals RE mapping 1200 shown in FIG. 12 is for illustration only. Other embodiments can be used without departing from the scope of the present disclosure.

In some embodiments, if one or more of OFDM symbols l=1, 2, 3 of slot 0 of a subframe are valid starting OFDM symbols of PDSCH, the CRS transmission and RE mapping can be according to LTE CRS RE mapping (or according to a new CRS RE mapping for LAA cell) for a subframe, except that the CRS at an OFDM symbol l=0 of slot 0 is not transmitted, as illustrated in FIG. 12. If a subframe is the first subframe of a DL transmission burst, the first subframe can be predefined or configurable that the CRS RE mapping for the subframe can be in accordance with mapping for non-MBSFN subframe or normal DL subframe (e.g. as in LTE specification, except the dropped OFDM symbol (before transmission)) regardless of whether the subframe has been configured as an MBSFN subframe or not.

Figure 13:
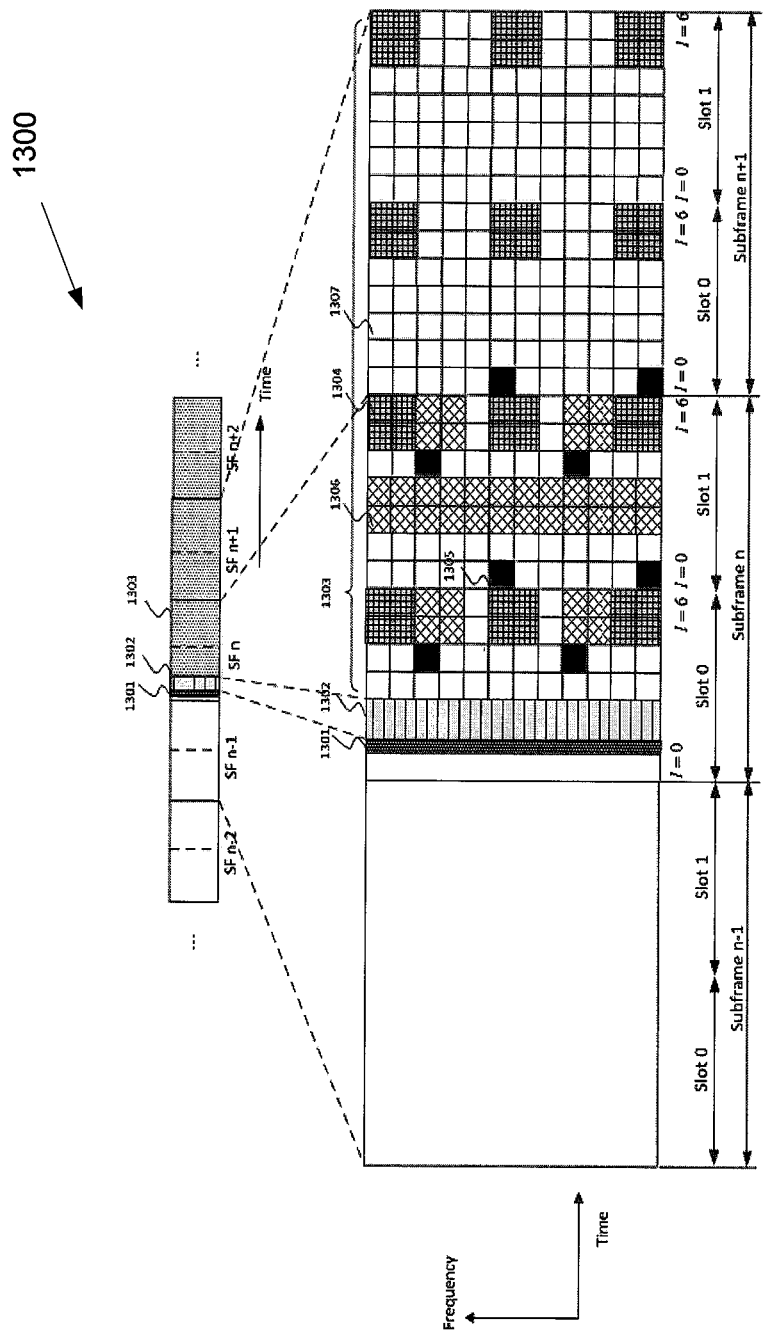
FIG. 13 illustrates another example reference signals RE mapping for an EPDCCH/PDSCH starting symbol at l=1, 2, 3 of slot 0 according to embodiments of the present disclosure.

FIG. 13 illustrates another example reference signals RE mapping for an EPDCCH/PDSCH starting symbol at l=1, 2, 3 of slot 0 according to embodiments of the present disclosure. An embodiment of the reference signals RE mapping 1300 shown in FIG. 13 is for illustration only. Other embodiments can be used without departing from the scope of the present disclosure.

In some embodiments, in order to maintain the same number of OFDM symbols mapped with CRS for maintaining the same synchronization performance, additional CRS can be mapped in the first OFDM symbol (l=0) of the next subframe as illustrated in FIG. 13. Alternatively, it can be predefined or configurable that the CRS RE mapping for the next subframe can be in accordance with mapping for non-MBSFN subframe or normal DL subframe (e.g. as in LTE specification) regardless of whether the subframe has been configured as an MBSFN subframe or not. In such embodiments, good synchronization performance may be insured while allowing reuse of CRS RE mapping implementation. In such embodiments, a minimum duration of an LAA DL transmission burst (e.g., control/data transmission, excluding possible initial signal such as reservation signal, PSS/SSS/CRS or other types of initial signal) can be defined to be one subframe plus 11 OFDM symbols. If the number of OFDM symbols for the ending subframe in a DL transmission burst can be smaller than the full number (14 for normal CP), e.g. X OFDM symbols, then the minimum duration of LAA DL transmission burst can be defined to be X+11 OFDM symbols.

As illustrated in FIG. 13, the OFDM symbol l=3 of slot 0 of subframe n is the starting OFDM symbol for PDSCH. OFDM symbols containing CRS 1305 are at least mapped to OFDM symbols l=4 of slot 0, l=0, 4 of slot 1 of subframe n and l=0 of slot 0 of subframe n+1.

Figure 14:
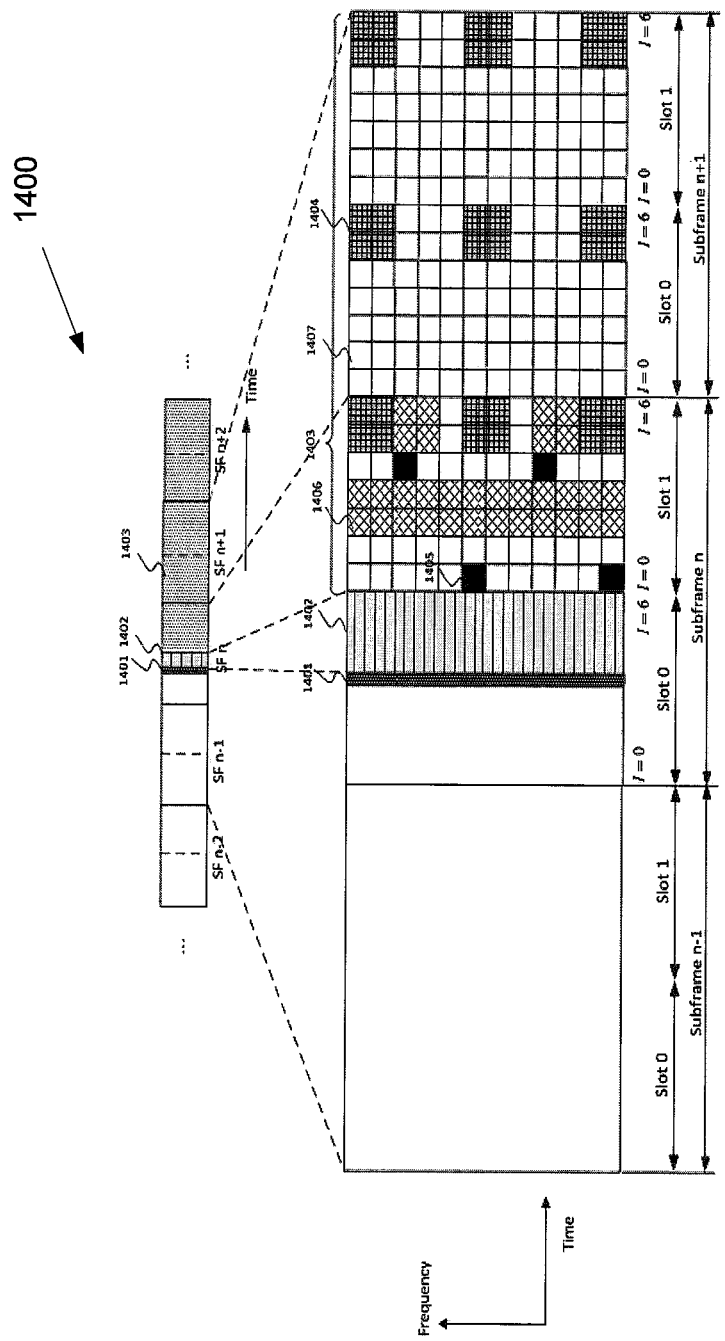
FIG. 14 illustrates an example reference signals RE mapping for an EPDCCH/PDSCH starting symbol at l=0 of slot 1 according to embodiments of the present disclosure.

FIG. 14 illustrates an example reference signals RE mapping for an EPDCCH/PDSCH starting symbol at l=0 of slot 1 according to embodiments of the present disclosure. An embodiment of the reference signals RE mapping 1400 shown in FIG. 14 is for illustration only. Other embodiments can be used without departing from the scope of the present disclosure.

If the OFDM symbols l=0 of slot 1 of a subframe is a valid starting OFDM symbol of PDCCH/EPDCCH/PDSCH, the CRS transmission and RE mapping can be according to the CRS RE mapping specified in LTE specification (or according to a new CRS RE mapping for LAA cell) for a subframe, except that the CRS in slot 0 of the subframe is not transmitted, as illustrated in FIG. 14. If a subframe is the first subframe of a DL transmission burst, it can be predefined or configurable that the CRS RE mapping for the subframe can be in accordance with mapping for non-MBSFN subframe or normal DL subframe (e.g. as in LTE specification, except the dropped OFDM symbol (before transmission)) regardless of whether the subframe has been configured as an MBSFN subframe or not.

Figure 15:
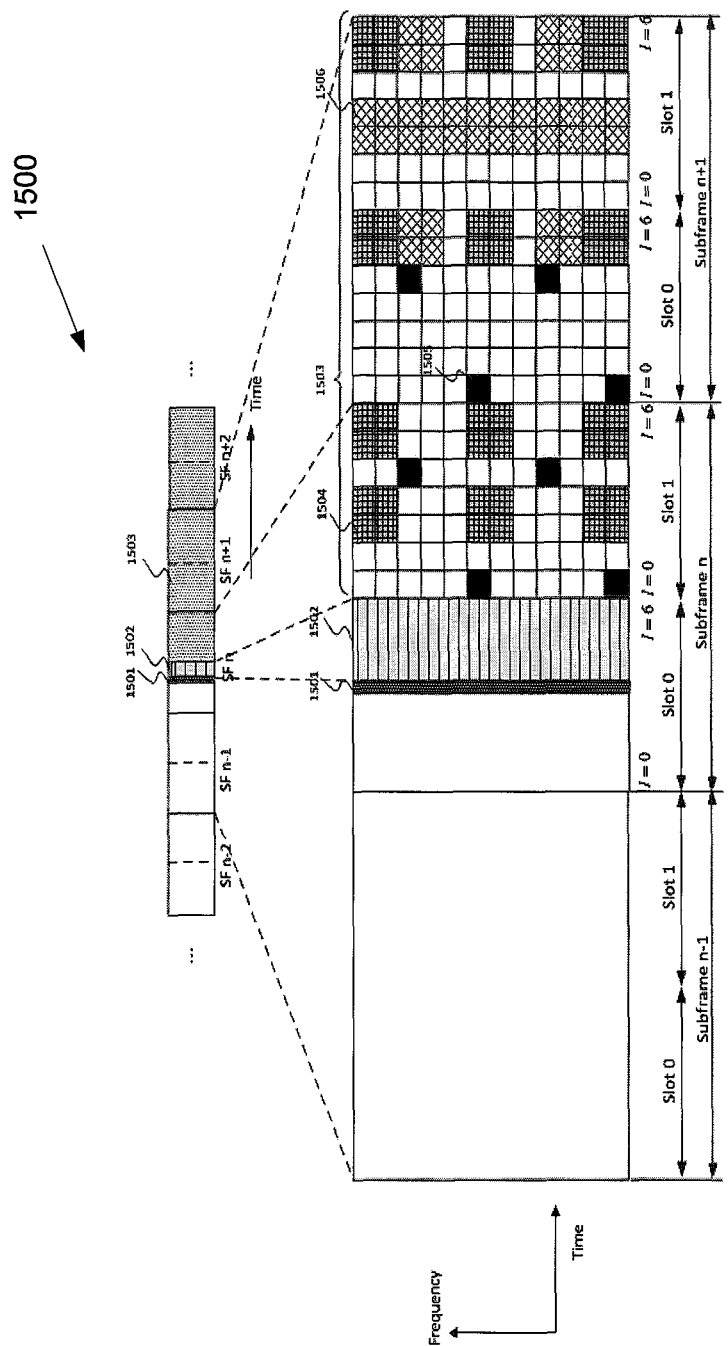
FIG. 15 illustrates another example reference signals RE mapping for an EPDCCH/PDSCH starting symbol at l=0 of slot 1 according to embodiments of the present disclosure.

FIG. 15 illustrates another example reference signals RE mapping for a PDCCH/EPDCCH/PDSCH starting symbol at l=0 of slot 1 according to embodiments of the present disclosure. An embodiment of the reference signals RE mapping 1500 shown in FIG. 15 is for illustration only. Other embodiments can be used without departing from the scope of the present disclosure.

In some embodiments, in order to maintain the same number of OFDM symbols mapped with CRS for maintaining the same synchronization performance, additional CRS can be mapped in the first OFDM symbol (l=0) and the fifth OFDM symbol (l=4) of the next subframe as illustrated in FIG. 15. Alternatively, it can be predefined or configurable that the CRS RE mapping for the next subframe can be in accordance with mapping for non-MBSFN subframe or normal DL subframe (e.g. as in LTE specification) regardless of whether the subframe has been configured as an MBSFN subframe or not. This can ensure good synchronization performance while allowing reuse of CRS RE mapping implementation. In such embodiments, a minimum duration of an LAA DL transmission burst (e.g., control/data transmission, excluding possible initial signal such as reservation signal, PSS/SSS/CRS or other types of initial signal) can be defined to be one subframe plus one slot (7 OFDM symbols for normal CP). If the number of OFDM symbols for the ending subframe in a DL transmission burst can be smaller than the full number (14 for normal CP), e.g. X OFDM symbols, then the minimum duration of LAA DL transmission burst can be defined to be X+11 OFDM symbols.

As illustrated in FIG. 15, an OFDM symbol l=0 of slot 1 of subframe n is the starting OFDM symbol for a PDSCH.

The OFDM symbols containing CRS (1505) are at least mapped to OFDM symbols l=0, 4 of slot 1 of subframe n and l=0, 4 of slot 0 of subframe n+1.

When a minimum burst duration that can depend on the starting OFDM symbol as described for the different examples above is known at the UE (either predefined or configured by the network), the UE can know availability of physical signals such as CRS depending on the starting OFDM symbol (without having to blindly detect the physical signal's presence) and utilize the knowledge for useful purposes. For example, if the UE determines that subframe n is a partial subframe at the beginning of the DL transmission burst, then the UE can also know that the next subframe of the DL transmission burst will contain CRS symbol(s) (without having to blindly detect the CRS presence) and utilize this knowledge for improving fine synchronization, channel estimation etc. for demodulating control/data in the partial subframe.

In some embodiments, a DL transmission burst can be defined from a UE's perspective, instead of a cell's perspective, i.e. if the cell transmits a burst of 10 ms duration (e.g., a subframe n to subframe n+10), and if a network transmits a CRS according to an RE mapping for non-MBSFN subframe in a subframe n and subframe n+5, a first UE may consider subframe n as the first subframe of its transmission burst, while a second UE may consider subframe n+5 as the first subframe of its transmission burst (e.g. if it is configured to wake up from DRX at subframe n+5).

In some embodiments, the detection of CRS in more than one OFDM symbol in a subframe can be used as one of the conditions to trigger PCFICH/PHICH/PDCCH/EPDCCH/ PDSCH monitoring/reception by the UE. Assuming a network always transmits 4 OFDM symbols for a CRS port 0 in a subframe if more than one CRS-port 0 OFDM symbol is transmitted in the subframe, the UE can use 2, or 3 or 4 CRS OFDM symbols for detecting the condition to perform PCFICH/PHICH/PDCCH/EPDCCH/PDSCH monitoring/ reception. More CRS OFDM symbols used can improve detection reliability but at the same time increases detection latency.

TABLE 1

| | | SCE SCell in LTE specification | LAA SCell in LTE specification |
|---|---|---|---|
| Activated SCell | | PDCCH monitoring on the SCell; PDCCH monitoring for the SCell; CSI measurement for the SCell; CQI/PMI/RI/PTI reporting for the SCell. | Blind detection of whether SCell is transmitting where start of transmission is determined by detection of at least two CRS OFDM symbols (port 0) in a subframe. The end of transmission is determined by absence of CRS (port 0) in the first OFDM symbol or by other signalling methods. If the activated SCell is determined to be transmitting: (E)PDCCH monitoring on the SCell; (E)PDCCH monitoring for the SCell; CSI measurement for the SCell; CQI/PMI/RI/PTI reporting for the SCell; PCFICH/PHICH monitoring on the SCell Else: No PDCCH monitoring on the SCell; No PDCCH monitoring for the SCell; No CSI measurement for the SCell; No CQI/PMI/RI/PTI reporting for the SCell; No PCFICH/PHICH monitoring on the SCell. |
| Deactivated SCell | | No PDCCH monitoring on the SCell; No PDCCH monitoring for the SCell; No CSI measurement for the SCell; No CQI/PMI/RI/PTI reporting for the SCell. | No blind detection of whether SCell is transmitting. No PDCCH monitoring on the SCell; No PDCCH monitoring for the SCell; No CSI measurement for the SCell; No CQI/PMI/RI/PTI reporting for the SCell; No PCFICH/PHICH monitoring on the SCell. |

In aforementioned embodiments, if a CRS is transmitted in every subframe of a DL transmission burst, then a CRS RE mapping can be repeated in every subframe of the DL transmission burst. In addition, it can be beneficial to have the same CRS transmission and RE mapping in every subframe of a LAA transmission burst, regardless of the actual starting OFDM symbol for a PDSCH. In particular, the CRS transmission and RE mapping can be defined according to the configuration with the least number of OFDM symbols for PDSCH in a subframe.

Figure 16:
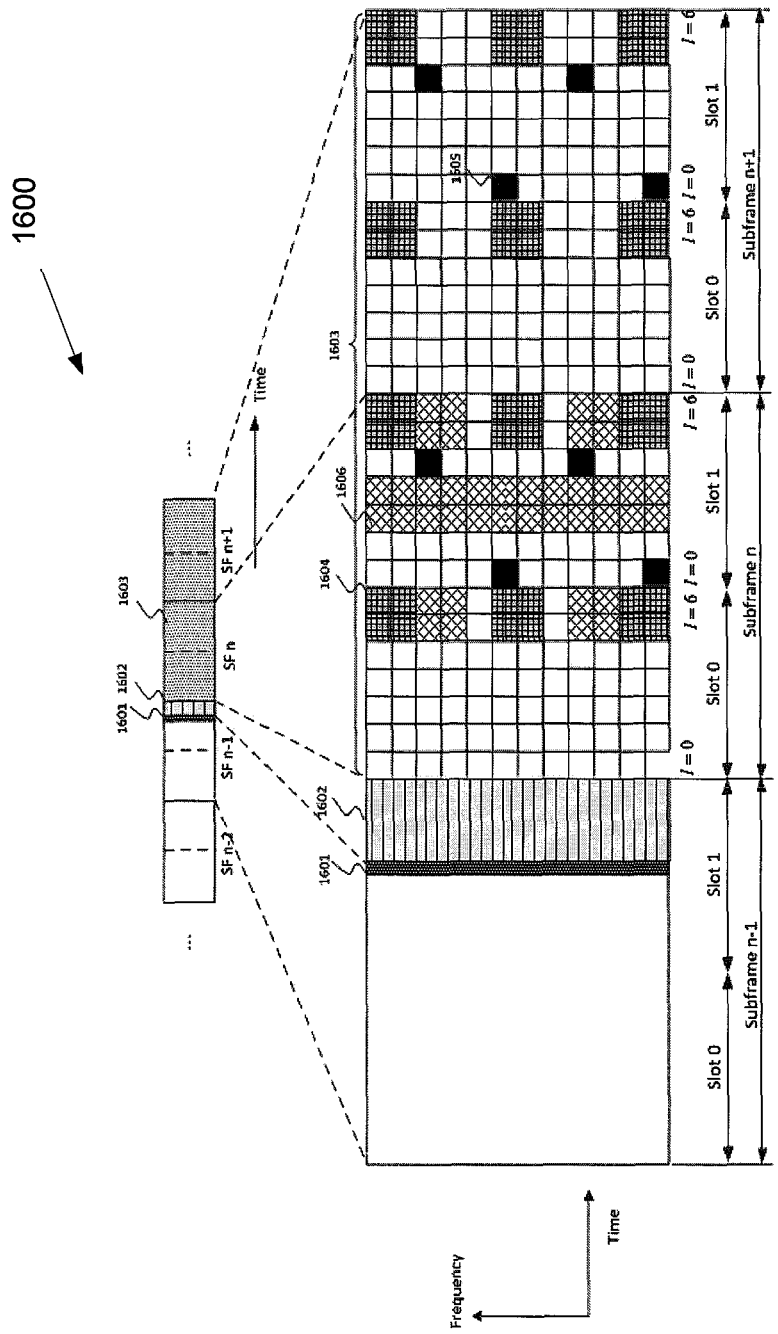
FIG. 16 illustrates an example common reference signals RE mapping according to embodiments of the present disclosure.

FIG. 16 illustrates an example common reference signals RE mapping according to embodiments of the present disclosure. An embodiment of the common reference signals RE mapping 1600 shown in FIG. 16 is for illustration only. Other embodiments can be used without departing from the scope of the present disclosure.

In some embodiments, if OFDM symbols l=0 of slot 1 of a subframe is a valid starting OFDM symbol of PDSCH and 7 OFDM symbols is the least number of OFDM symbols for PDSCH transmission, the OFDM symbols containing CRS can be l=0, 4 of slot 1 of every subframe, as illustrated in FIG. 16. In such embodiments, a minimum duration of LAA DL transmission burst can be defined to be 1 slot.

Figure 17A:
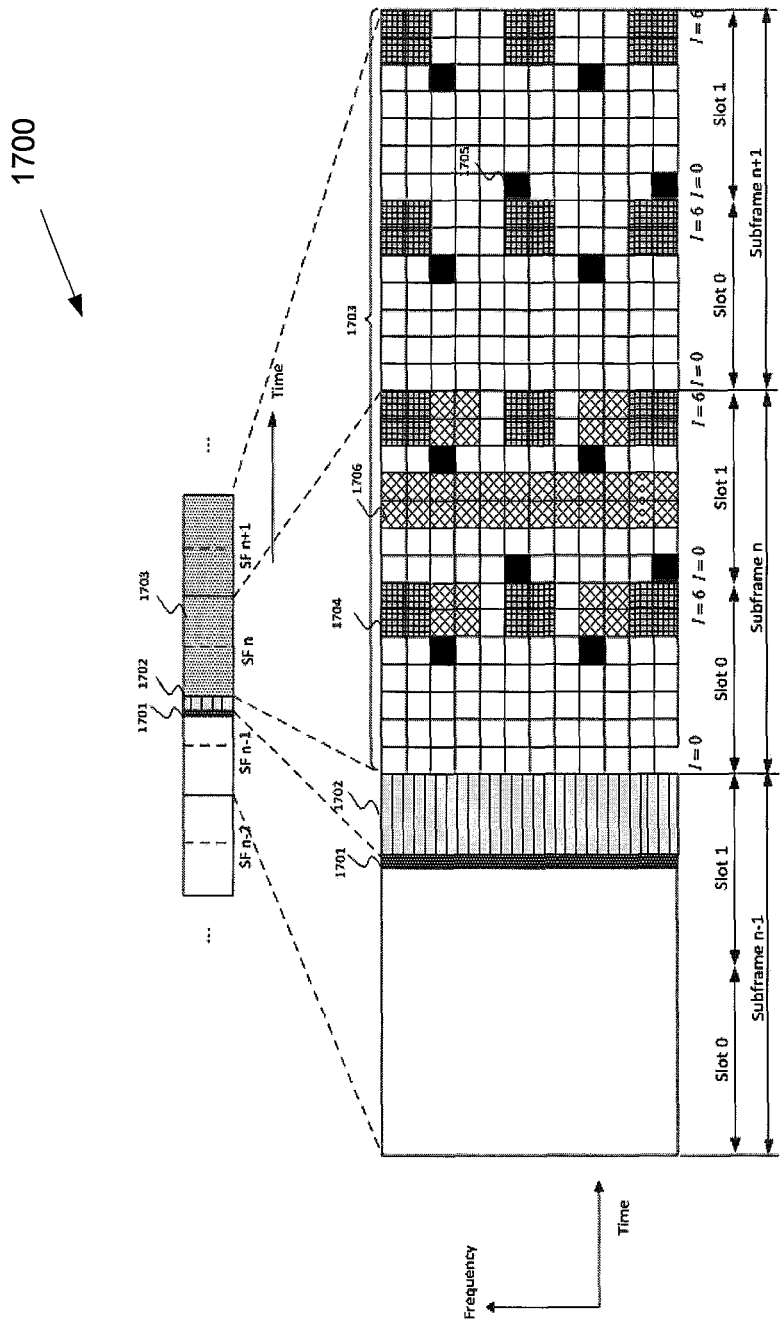
FIG. 17A illustrates another example common reference signals RE mapping according to embodiments of the present disclosure.

FIG. 17A illustrates another example common reference signals RE mapping according to embodiments of the present disclosure. An embodiment of the common reference signals RE mapping 1700 shown in FIG. 17A is for illustration only. Other embodiments can be used without departing from the scope of the present disclosure.

In some embodiments, if OFDM symbols l=3 of slot 0 of a subframe is a valid starting OFDM symbol of PDSCH and 11 OFDM symbols is the least number of OFDM symbols for PDSCH transmission, the OFDM symbols containing CRS can be l=4 of slot 0 and l=0, 4 of slot 1 of every subframe, as illustrated in FIG. 17A. In such embodiments, a minimum duration of LAA DL transmission burst can be defined to be 11 OFDM symbols (for normal CP).

Figure 17B:
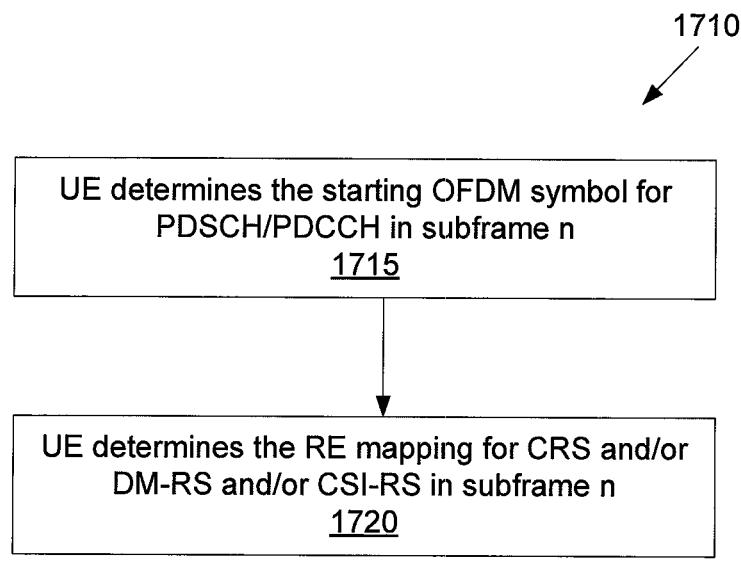
FIG. 17B illustrates a flowchart of determination method of an RE mapping of reference signals at a UE according to embodiments of the present disclosure.

FIG. 17B illustrates a flowchart of determination method of an RE mapping of reference signals at a UE according to embodiments of the present disclosure. An embodiment of the method 1710 shown in FIG. 17B is for illustration only. Other embodiments can be used without departing from the scope of the present disclosure. As illustrated in FIG. 17B, the method 1710 begins at step 1715. At step 1715, the UE determined the starting OFDM symbol(s) for PDSCH or PDCCH in a subframe n. And the UE determines, at step 1720, the RE mapping for CRS and/or DM-RS and/or CSI-RS in the subframe n.

A DM-RS (corresponding to one or more of port 7 to 14) transmission and an RE mapping can depend on the starting OFDM symbol of PDSCH and/or EPDCCH and/or PDCCH on an LAA cell. A PDSCH is used as example in this disclosure for ease of exposition. Other examples of physical channel can be used without departing from the scope of the present disclosure.

In some embodiments, if one or more of OFDM symbols l=0, 1, 2, 3 of slot 0 of a subframe are valid starting OFDM symbols of PDSCH, a DM-RS RE mapping can be, according to LTE specification, DM-RS RE mapping for a subframe, as illustrated in FIG. 11 (e.g., 1104) and FIG. 12 (e.g., 1204).

If OFDM symbols l=0 of slot 1 of a subframe is a valid starting OFDM symbol of PDCCH/EPDCCH/PDSCH, the DM-RS transmission and RE mapping can be, according to LTE specification, DM-RS RE mapping for a subframe, except that the DM-RS in slot 0 of the subframe is not transmitted, as illustrated in FIG. 14. In some embodiments, in order to maintain the same density of DM-RS that is beneficial for PDSCH demodulation performance, additional DM-RS can be transmitted, e.g. in l=2, 3 of slot 1 of the subframe, as illustrated in FIG. 15 (e.g., 1504).

A CSI-RS (corresponding to one or more of port 15 to 22) transmission and a RE mapping can depend on the starting OFDM symbol of PDSCH and/or EPDCCH and/or PDCCH on an LAA cell. A PDSCH is used as example in this disclosure for ease of exposition. Other examples of physical channel can be used without departing from the scope of the present disclosure.

In some embodiments, if one or more of OFDM symbols l=0, 1, 2, 3 of slot 0 of a subframe are valid starting OFDM symbols of PDSCH, the CSI-RS RE mapping can be, according to LTE specification, a CSI-RS RE mapping for a subframe, as illustrated in FIG. 11 (e.g., 1106) and FIG. 12 (e.g., 1206).

In some embodiments, if OFDM symbols l=0 of slot 1 of a subframe is a valid starting OFDM symbol of PDCCH/EPDCCH/PDSCH, the DM-RS transmission and RE mapping can be, according to LTE specification, a CSI-RS RE mapping for a subframe, except that the CSI-RS in slot 0 of the subframe is not transmitted, as illustrated in FIG. 14.

In some embodiments, in order to maintain the same number of resources for CSI-RS, the CSI-RS resources in slot 0 of the subframe can be transmitted in l=5, 6 of slot 0 in the next subframe instead. In some embodiments, a CSI-RS resources transmission can be delayed to the next subframe, as illustrated in FIG. 15 (e.g., 1506).

In some embodiments, a DM-RS transmission and an RE mapping can depend on the ending OFDM symbol of PDSCH and/or EPDCCH and/or PDCCH for a DL transmission burst on an LAA cell. A PDSCH is used as example in this disclosure for ease of exposition. Other examples of physical channel can be used without departing from the scope of the present disclosure.

Figure 18:
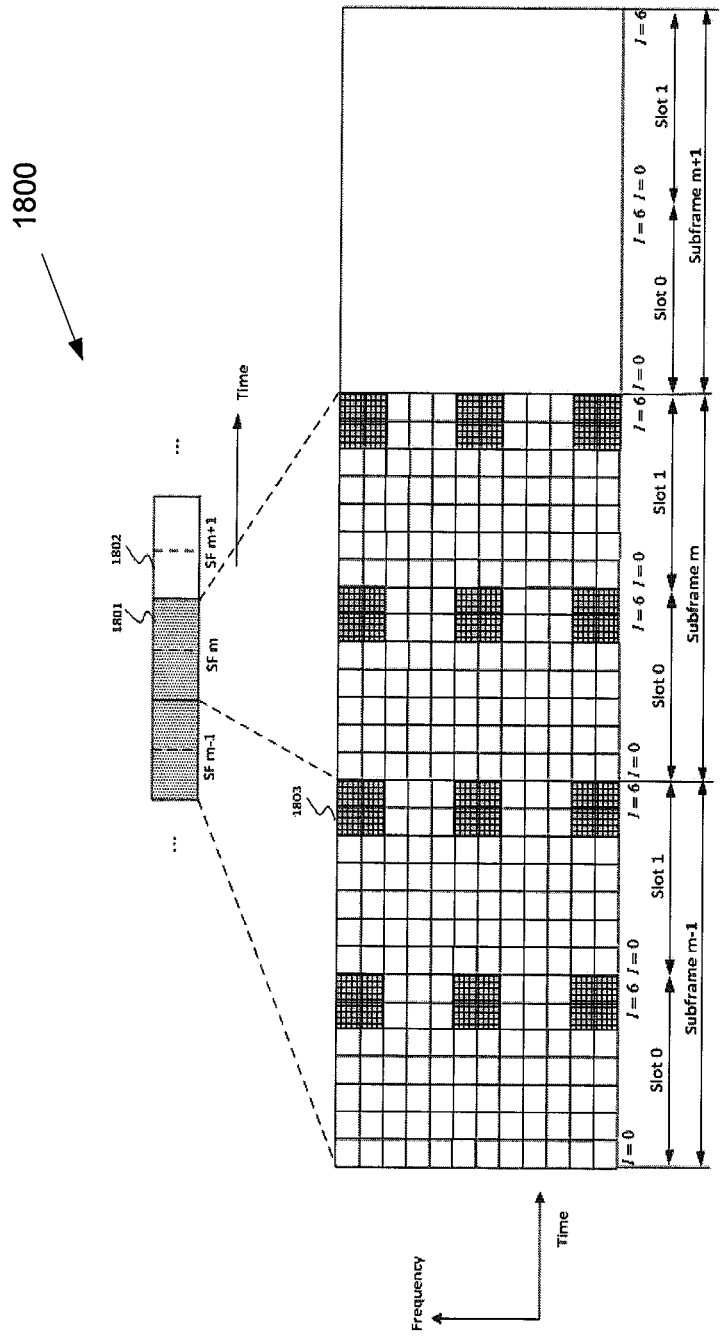
FIG. 18 illustrates an example demodulation reference signal resource element (DM-RS RE) mapping for an EPDCCH/PDSCH ending symbol at l=6 of slot 1 according to embodiments of the present disclosure.

FIG. 18 illustrates an example DM-RS RE mapping for an EPDCCH/PDSCH ending symbol at l=6 of slot 1 according to embodiments of the present disclosure. An embodiment of the DM-RS RE mapping 1800 shown in FIG. 18 is for illustration only. Other embodiments can be used without departing from the scope of the present disclosure.

In some embodiments, if one or more of OFDM symbols l=14 of slot 1 of a subframe are valid ending OFDM symbols of EPDCCH/PDSCH, the DM-RS RE mapping can be, according to LTE specification, a DM-RS RE mapping for a subframe, as illustrated in FIG. 18 (e.g., 1803).

Figure 19:
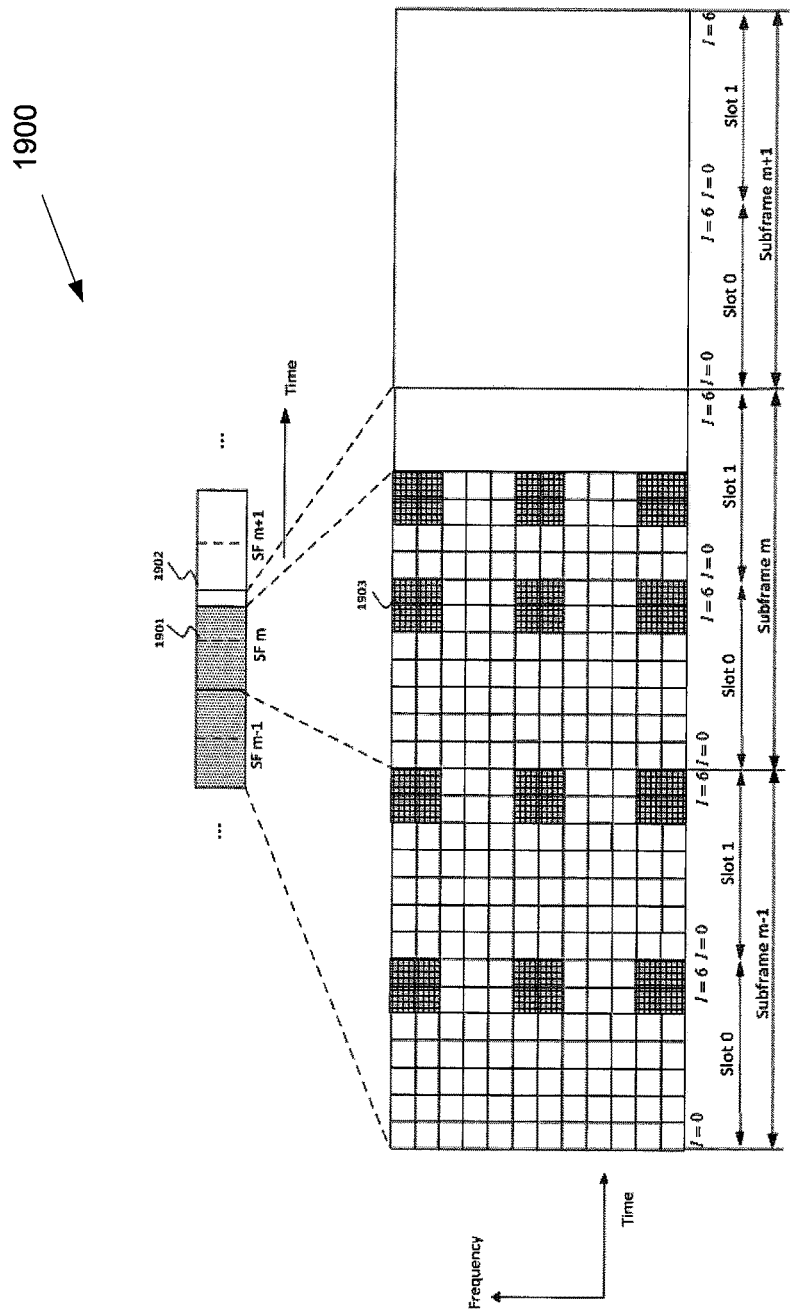
FIG. 19 illustrates an example DM-RS RE mapping for an EPDCCH/PDSCH ending symbol at l=3 of slot 1 according to embodiments of the present disclosure.

FIG. 19 illustrates an example DM-RS RE mapping for an EPDCCH/PDSCH ending symbol at l=3 of slot 1 according to embodiments of the present disclosure. An embodiment of the DM-RS RE mapping 1900 shown in FIG. 19 is for illustration only. Other embodiments can be used without departing from the scope of the present disclosure.

In some embodiments, if OFDM symbols l=3 of slot 1 of a subframe is a valid ending OFDM symbol of EPDCCH/PDSCH, the DM-RS transmission and RE mapping can be according to the Rel-12 DM-RS RE mapping for a subframe, except that the DM-RS in OFDM symbols l=5 and 6 in slot 1 of the subframe is not transmitted. In another approach, in order to maintain the same density of DM-RS which is beneficial for EPDCCH/PDSCH demodulation performance, additional DM-RS can be transmitted, e.g. in l=2, 3 of slot 1 of the subframe, as illustrated in FIG. 19 (e.g., 1903).

Figure 20:
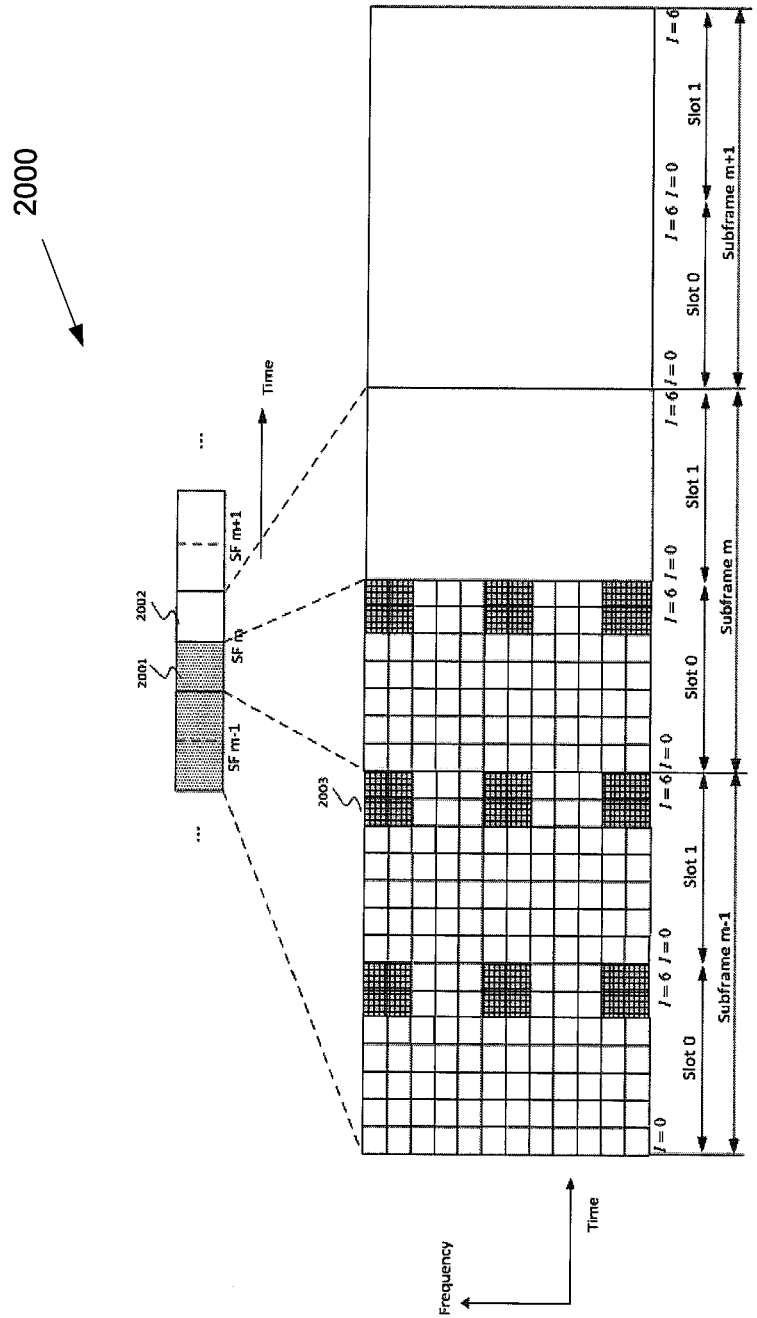
FIG. 20 illustrates an example DM-RS RE mapping for an EPDCCH/PDSCH ending symbol at l=6 of slot 0 according to embodiments of the present disclosure.

FIG. 20 illustrates an example DM-RS RE mapping for an EPDCCH/PDSCH ending symbol at l=6 of slot 0 according to embodiments of the present disclosure. An embodiment of the DM-RS RE mapping 2000 shown in FIG. 20 is for illustration only. Other embodiments can be used without departing from the scope of the present disclosure.

In some embodiments, if OFDM symbols l=14 of slot 0 of a subframe is a valid ending OFDM symbol of EPDCCH/PDSCH, the DM-RS transmission and RE mapping can be according to the Rel-12 DM-RS RE mapping for a subframe, except that the DM-RS in slot 1 of the subframe is not transmitted, as illustrated in FIG. 20.

Figure 21:
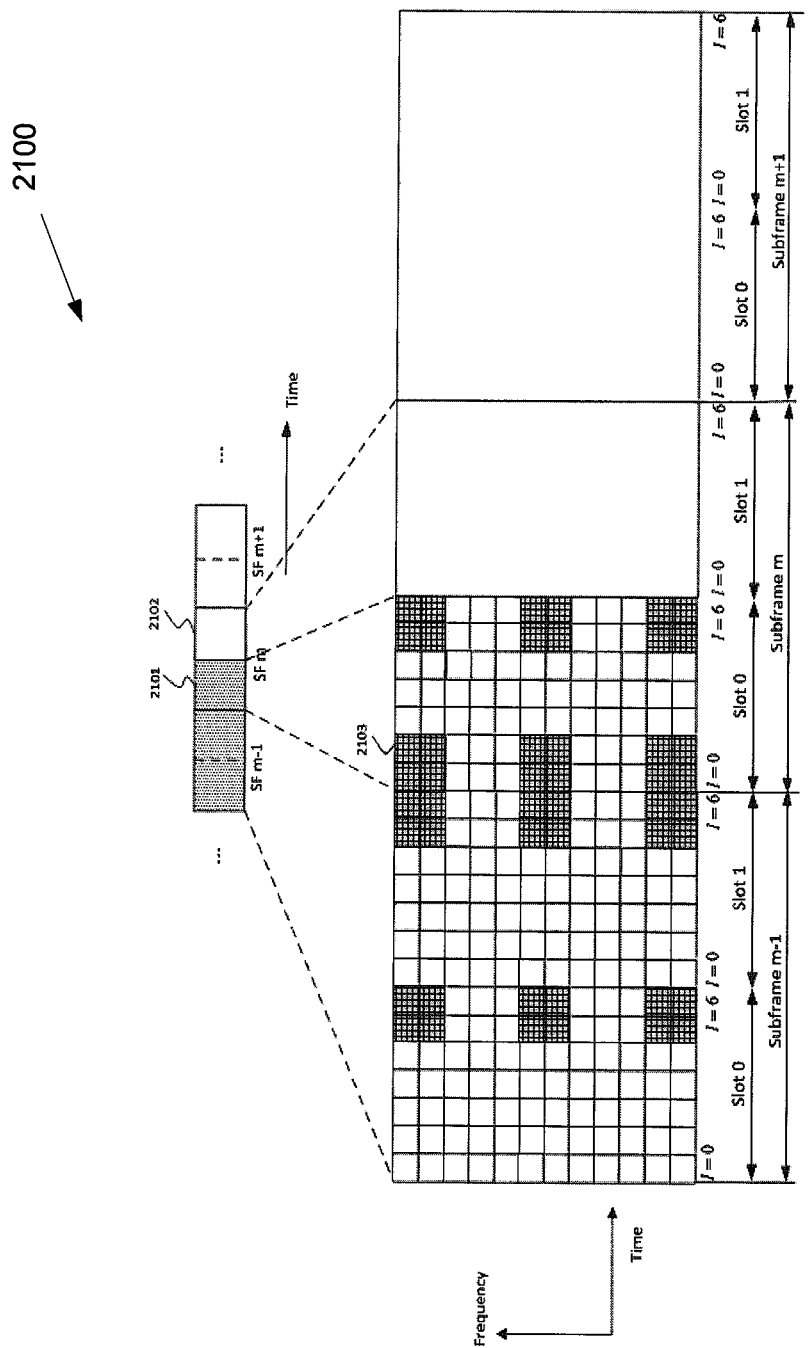
FIG. 21 illustrates an example DM-RS RE mapping for an EPDCCH/PDSCH ending symbol at l=6 of slot 0 according to embodiments of the present disclosure.

FIG. 21 illustrates an example DM-RS RE mapping for an EPDCCH/PDSCH ending symbol at l=6 of slot 0 according to embodiments of the present disclosure. An embodiment of the DM-RS RE mapping 2100 shown in FIG. 21 is for illustration only. Other embodiments can be used without departing from the scope of the present disclosure.

In some embodiments, in order to maintain the same density of DM-RS which is beneficial for EPDCCH/PDSCH demodulation performance, additional DM-RS can be transmitted, e.g. in l=0, 1 of slot 0 of the subframe, as illustrated in FIG. 21 (e.g., 2103).

The starting and/or the ending OFDM symbol for PDCCH or EPDCCH, or PDSCH generally depend on the timing of eNodeB gains access to the unlicensed channel. There is a need to indicate to the UE the starting and/or the ending OFDM symbol for PDCCH or EPDCCH, or PDSCH so that the UE can determine the RE mapping for the reference signals and can demultiplexing the correct REs for PDCCH or EPDCCH, or PDSCH demodulation.

A set of possible starting and/or ending OFDM symbols for PDCCH/EPDCCH/PDSCH can be either predefined or configured by a network, e.g. using RRC signaling from another serving cell such as a PCell, depending on a network implementation preference, a network load and a desired channel access probability. For example, if a load is low, a network may configure only 2 possible starting and/or ending OFDM symbols (e.g. l=0 of slot 0, and l=0 of slot 1 for starting OFDM symbols); whereas if the load is high, the network may configure higher number of possible starting and/or ending OFDM symbols, e.g. 4, such as l=0, 1, 2, 3 of slot 0, or l=0, 1, 2 of slot 0 and l=0 of slot 1, or l=1, 2, 3 of slot 0 and l=0 of slot 1 for starting OFDM symbols. In another example, if a traffic load in an LAA cell is low, a network may configure only 1 possible starting and/or ending OFDM symbols (e.g. l=0 of slot 0 for a starting OFDM symbol); whereas if the traffic load in the LAA cell is high, the network may configure higher number of possible starting and/or ending OFDM symbols, e.g. 2, such as l=0 of slot 0 and l=0 of slot 1 for starting OFDM symbols.

A network configuration can specify a number of positions that can be mapped to predefined actual time positions, where an example is shown in TABLE 2 for starting OFDM symbols for PDSCH. A network configuration (e.g. by RRC) can also directly specify the actual sets of starting and/or ending OFDM symbols for PDSCH, e.g. using a bitmap where each bit corresponds to a predefined starting/ending OFDM symbol position. A bit value of 1 can indicate that the corresponding starting/ending OFDM symbol position is configured whereas bit value of 0 can indicate that the corresponding starting/ending OFDM symbol position is not configured.

TABLE 2

| Number of starting OFDM symbols for PDSCH | Starting OFDM symbols for PDSCH |
| --- | --- |
| 2 | l = 0 of slot 0, and l = 0 of slot 1 |
| 3 | l = 0, 1 of slot 0, and l = 0 of slot 1 |
| 4 | l = 0, 1, 2 of slot 0, and l = 0 of slot 1 |

Figure 22:
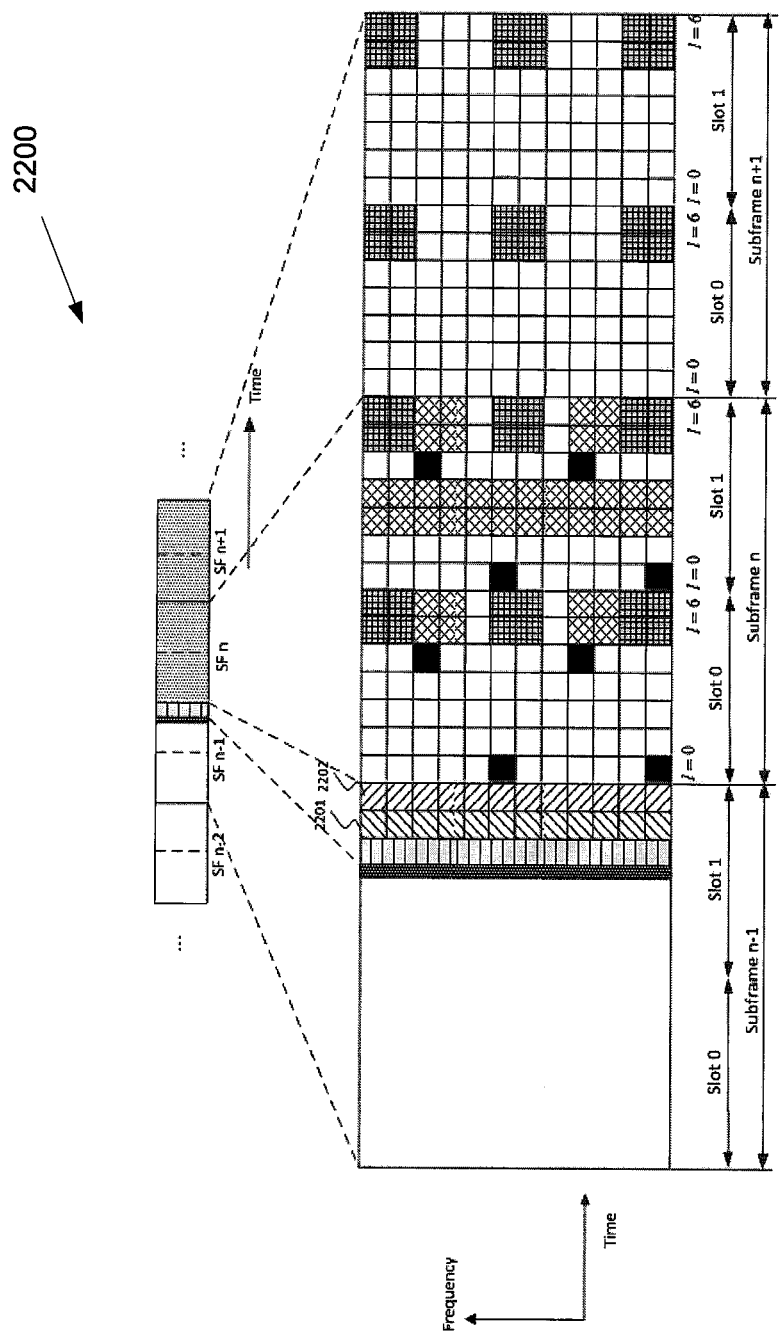
FIG. 22 illustrates an example implicit signaling for an EPDCCH/PDSCH starting symbol at l=0 of slot 0 according to embodiments of the present disclosure.

FIG. 22 illustrates an example implicit signaling for a PDCCH/EPDCCH/PDSCH starting symbol at l=0 of slot 0 according to embodiments of the present disclosure. An embodiment of the implicit signaling 2200 shown in FIG. 22 is for illustration only. Other embodiments can be used without departing from the scope of the present disclosure.

In some embodiments, the starting OFDM symbol can be determined by the transmission timing of another physical signal, such as the initial signals. In such embodiments, synchronization signals e.g. the PSS, and/or SSS and/or the CRS can be the initial signals. A UE can determine the starting OFDM symbol for PDSCH by detecting the transmission timing of the physical signals. In one example, to indicate the starting OFDM at l=q in a subframe, PSS and SSS can be transmitted in two OFDM symbols immediately prior to l=q. For instance, to indicate the starting OFDM at l=0 in slot 0 of subframe n, PSS and SSS can be transmitted at OFDM symbol l=6 and l=5 of slot 1 of subframe n−1, respectively, as illustrated in FIG. 22. The UE can determine the starting OFDM symbol for PDSCH at l=0 of slot 0 of subframe n by detecting the presence of the PSS (e.g., 2202) and the SSS (e.g., 2201) at OFDM symbol l=6 and l=5 of slot 1 of subframe n−1, respectively.

Figure 23:
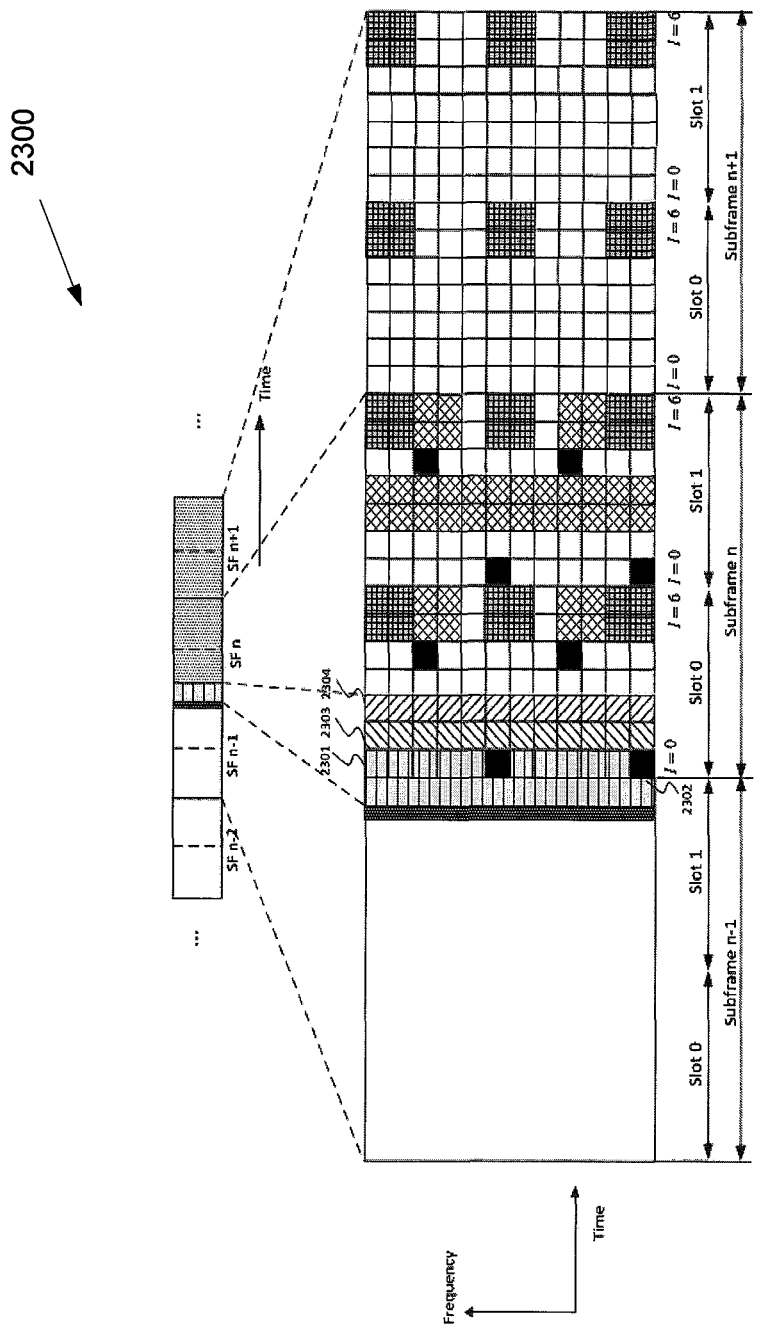
FIG. 23 illustrates an example implicit signaling for EPDCCH/PDSCH starting symbol at l=1, 2, 3 of slot 0 according to embodiments of the present disclosure.

FIG. 23 illustrates an example implicit signaling for EPDCCH/PDSCH starting symbol at l=1, 2, 3 of slot 0 according to embodiments of the present disclosure. An embodiment of the implicit signaling 2300 shown in FIG. 23 is for illustration only. Other embodiments can be used without departing from the scope of the present disclosure.

In some embodiments, to indicate the starting OFDM at l=3 of slot 0 of subframe n, PSS and SSS can be transmitted at OFDM symbol l=1 and l=2 of slot 0 of subframe n, respectively, as illustrated in FIG. 23. In such embodiments, a UE can determine the starting OFDM symbol for PDCCH/EPDCCH/PDSCH at l=0 of slot 0 of subframe n by detecting the presence of the PSS (e.g., 2304) and the SSS (e.g., 2303). In addition, to maintain the same number of CRS REs for subframe n, CRS (2302) can also be transmitted at l=0 (e.g., 2301) of slot 0 of subframe n.

In some embodiments, the starting/ending OFDM symbol for PDSCH of a subframe can be indicated using a common DCI of EPDCCH or other common physical control channel, monitored and received by multiple UEs. For example 2 bits in the common DCI can be used to indicate 4 different starting positions (e.g. l=0, 1, 2, 3 of slot 0, or l=1, 2, 3 of slot 0 and l=0 of slot 1, or l=0, 1, 2 of slot 0 and l=0 of slot 1). The CRC of the EPDCCH for the common DCI can be scrambled with a UE-common RNTI.

A search space for the common DCI indicating the starting OFDM symbol can be independent of the actual starting OFDM symbol in order to reduce the number of hypotheses for the UE searching for the common DCI. In one example, if l=3 of slot 0 is the latest possible starting OFDM symbol in a subframe, then the search space for the common DCI within a configured set of EPDCCH PRBs can be restricted to the region spanning from l=3 of slot 0 to the last OFDM symbol of slot 1 in the same subframe. In this example, the UE uses the DM-RS in OFDM symbols l=5, 6 of slot 0 and l=5, 6 of slot 1 for demodulation of the common EPDCCH. In a second example, if l=0 of slot 1 is the latest possible starting OFDM symbol in a subframe, then the search space for the common DCI within EPDCCH PRBs can be restricted to the region spanning from l=0 of slot 1 to the last OFDM symbol of slot 1 in the same subframe. In this example, the UE uses the DM-RS in OFDM symbols l=5, 6 of slot 1 for demodulation of the common EPDCCH.

After decoding the starting OFDM symbol for EPDCCH/PDSCH from the common DCI, the UE searches for UE-specific DCI from the configured set of EPDCCH PRBs where the control region spans from the indicated starting OFDM symbol to the last OFDM symbol in the subframe. The control region for the common DCI is also a part of the control region for the UE-specific DCI. If PDSCH is assigned to the UE, then the UE receives PDSCH assuming the indicated starting OFDM symbol from the common DCI.

Figure 24:
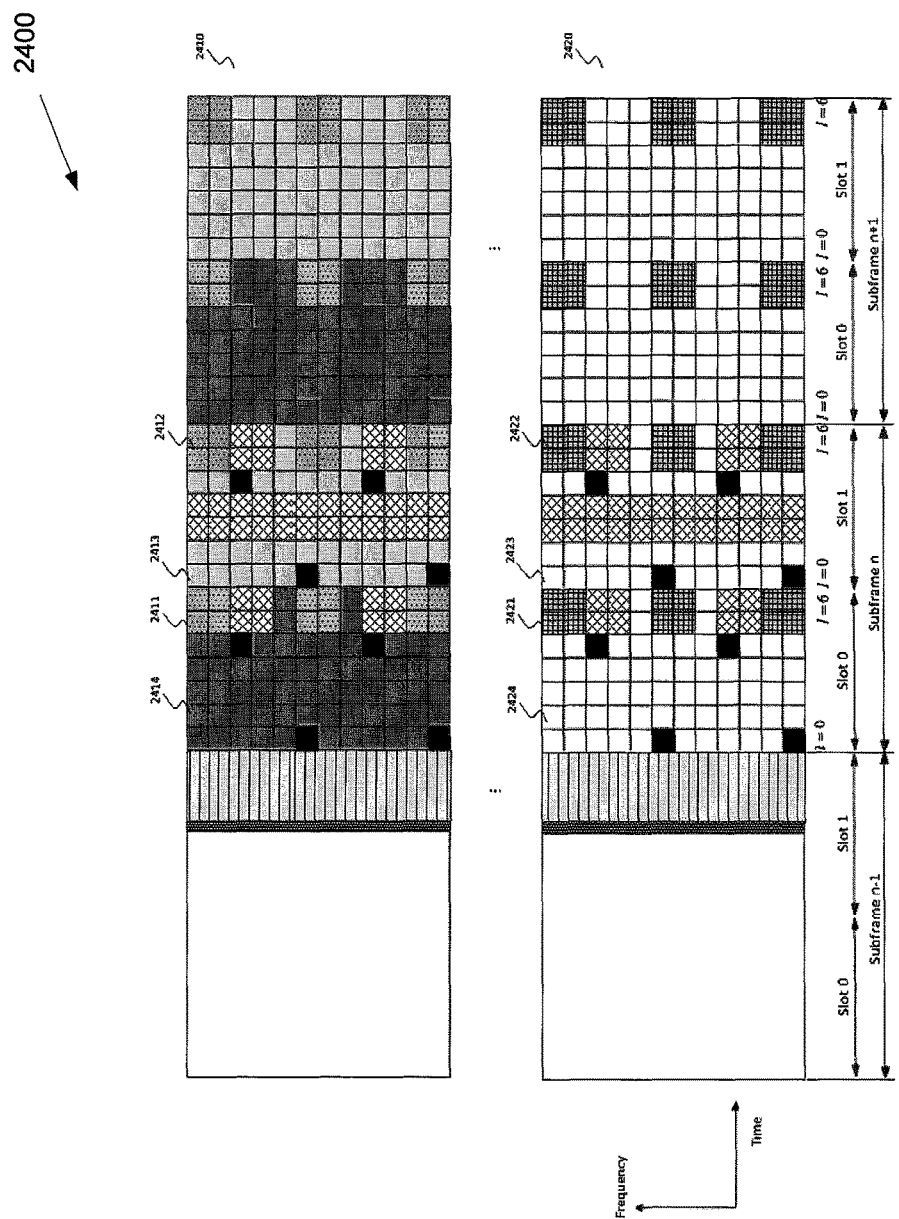
FIG. 24 illustrates an example control channel for a license assisted access (LAA) cell according to embodiments of the present disclosure.

FIG. 24 illustrates an example control channel for a license assisted access (LAA) cell according to embodiments of the present disclosure. An embodiment of the control channel 2400 shown in FIG. 24 is for illustration only. Other embodiments can be used without departing from the scope of the present disclosure. An illustrated in FIG. 24, where search space for the common DCI is restricted to the second slot of a subframe (e.g., 2413). Assuming the indicated starting OFDM symbol is the first OFDM symbol of the subframe, the UE-specific EPDCCH region includes all OFDM symbols in the subframe of the configured EPDCCH PRBs (e.g., 2414 and 2413).

The UE uses DM-RS in OFDM symbols l=5, 6 of slot 1 for demodulation of the common EPDCCH (2412), and DM-RS in OFDM symbols l=5, 6 of slot 0 and slot 1 for demodulation of the UE-specific EPDCCH (e.g., 2411). The UE demodulates PDSCH in the assigned PRBs assuming the indicated starting OFDM symbol, using DM-RS (e.g., 2421 and 2422).

There can be one common DCI for every subframe of an LAA DL transmission burst. The UE can be required to monitor and decode the common DCI for every subframe of an LAA DL transmission burst. If the common DCI is absent, the UE may assume that LAA signals from the serving cell (including CRS, CSI-RS, PDSCH, and EPDCCH) are not present. Alternatively, for saving common DCI overhead, the common DCI is only present in a subset of subframes of the DL transmission burst, e.g. the first subframe of the burst, or once every multiple number of subframes in the burst. A common DCI can indicate the starting OFDM symbol of PDSCH of the first subframe as well as the duration of the current/remaining DL transmission burst, whereby the UE can assume PDSCH/EPDCCH starts from the first OFDM symbol for the subsequent subframes of the burst.

A common DCI can also be used to indicate the ending OFDM symbol for the last PDSCH of the current transmission burst. For example, if the last PDSCH of the burst is subframe m, the common DCI in subframe m−1 can indicate the ending OFDM symbol of the last PDSCH. Alternatively, if the common DCI is transmitted only in the first/a subset of subframes of the burst, the ending OFDM symbol of the last PDSCH can be included there.

Figure 25:
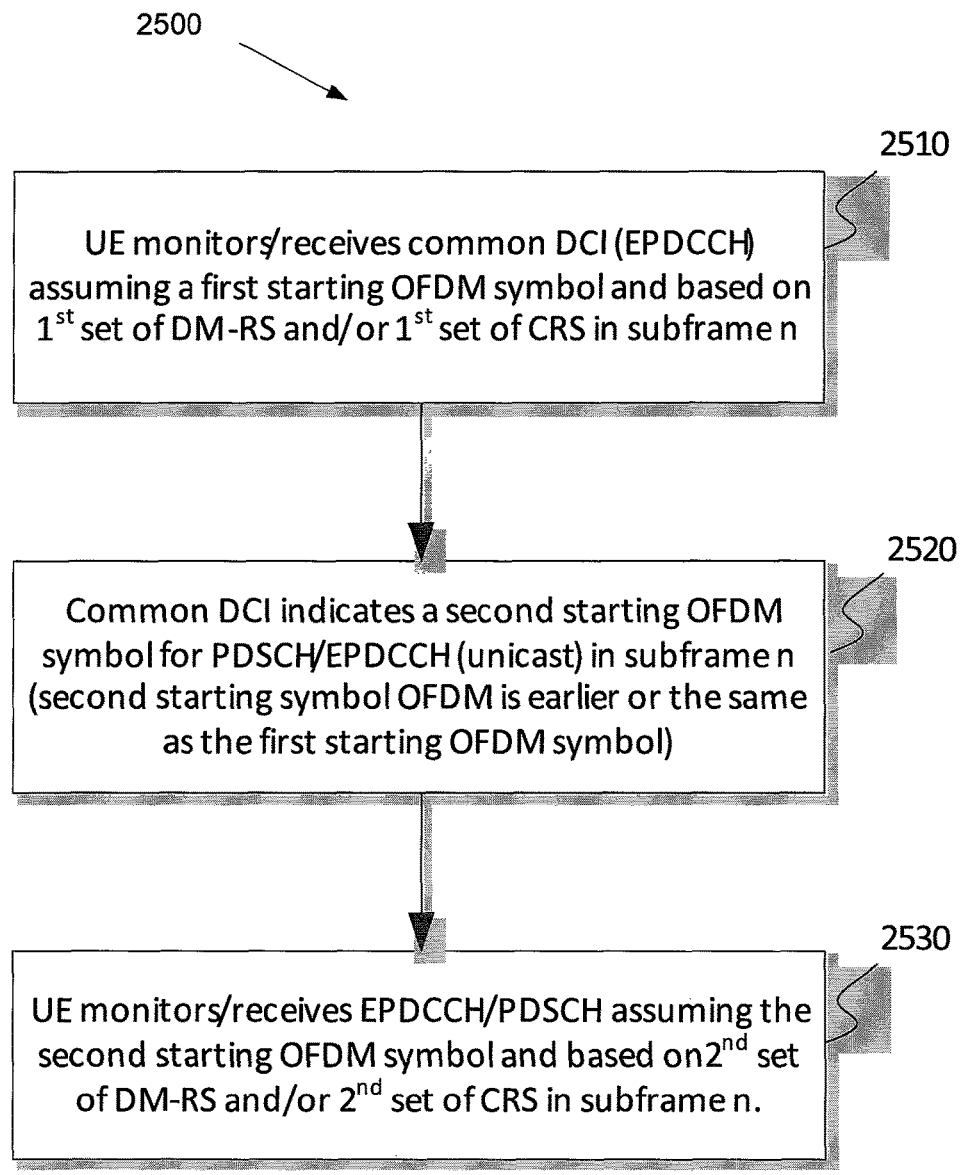
FIG. 25 illustrates a flowchart of explicit signaling method for determining an EPDCCH/PDSCH starting symbol according to embodiments of the present disclosure.

FIG. 25 illustrates a flowchart of explicit signaling method for determining an EPDCCH/PDSCH starting symbol according to embodiments of the present disclosure. The flowchart of the explicit signaling method 2500 shown in FIG. 25 is for illustration only. Other embodiments can be used without departing from the scope of the present disclosure.

As illustrated in FIG. 25, the signaling method 2500 begins at step 2510. At step 2510, the UE monitors and receives common DCI (EPDCCH) assuming a first starting OFDM symbol and based on a first set of DM-RS and/or a first set of CRS in a subframe n. Subsequently, the UE identifies, at step 2520, a common DCI that indicates a second starting OFDM symbol for PDSCH/EPDCCH (unicast) in subframe n (second starting symbols OFDM is earlier or the same as the first starting OFDM symbols). Finally, the UE monitors and receives EPDCCH/PDSCH assuming the second starting OFDM symbols and based on the second set of DM-RS and/or the second set of CRS in subframe n.

Figure 26:
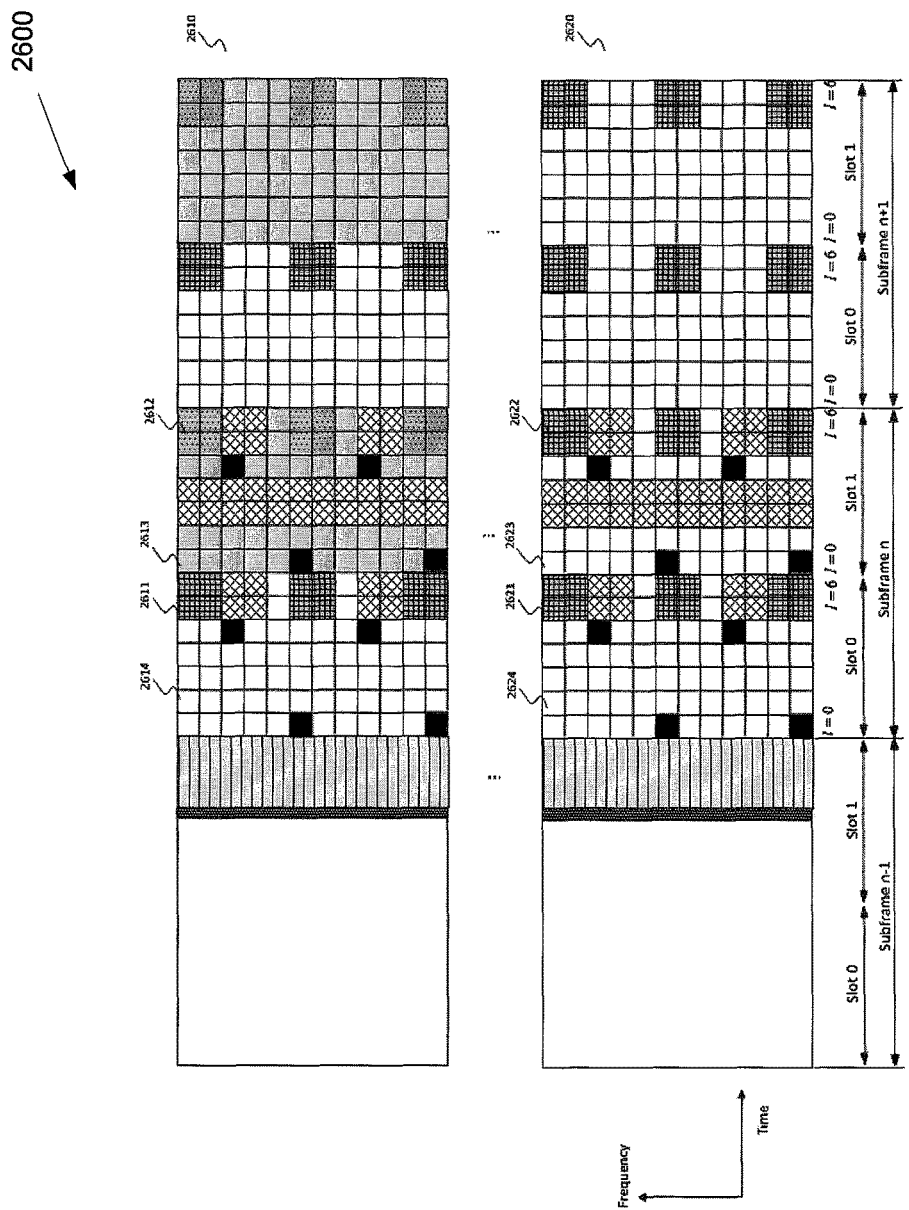
FIG. 26 illustrates an example control channel for a licensed assisted access (LAA) cell according to embodiments of the present disclosure.

FIG. 26 illustrates an example control channel for LAA cell according to embodiments of the present disclosure. An embodiment of the control channel 2600 shown in FIG. 26 is for illustration only. Other embodiments can be used without departing from the scope of the present disclosure.

In some embodiments, the starting/ending OFDM symbol for PDSCH of a subframe can be indicated using UE-specific DCI of EPDCCH. The search space for the UE-specific DCI indicating the starting OFDM symbol can be independent of the actual starting OFDM symbol in order to reduce the number of hypotheses for the UE searching for the UE-specific DCI. In an example, if l=0 of slot 1 is the latest possible starting OFDM symbol in a subframe, then the search space for the UE-specific DCI within EPDCCH PRBs can be restricted to the region spanning from l=0 of slot 1 to the last OFDM symbol of slot 1 in the same subframe. In this example, the UE uses the DM-RS in OFDM symbols l=5, 6 of slot 1 for demodulation of the UE-specific EPDCCH. In case the starting OFDM symbol for PDSCH is earlier than that for EPDCCH, the REs before EPDCCH can be used for PDSCH transmission. In this case, the DM-RS of slot 0 can be used for PDSCH demodulation as illustrated in FIG. 26.

As illustrated in FIG. 26, assuming the indicated starting OFDM symbol is the first OFDM symbol of the subframe, the UE uses DM-RS in OFDM symbols l=5, 6 of slot 1 for demodulation of the UE-specific EPDCCH (e.g., 2412), and DM-RS in OFDM symbols l=5, 6 of slot 0 for demodulation of PDSCH (e.g., 2611) with overlapping subcarriers with EPDCCH (e.g., 2610). For PDSCH with non-overlapping subcarriers with EPDCCH (e.g., 2620), the UE demodulates PDSCH in the assigned PRBs assuming all DM-RS in the subframe (e.g., 2621 and 2622).

For the purposes of cell detection and RRM measurement on an unlicensed carrier, an eNB may desire to periodically transmit discovery signals (e.g., DRS) and multiplex them as part of a downlink data burst. Depending on the periodic configuration of the DRS transmissions (e.g., the DMTC and DRS period), a DRS transmission may overlap with a partial subframe at either the start or end of the data burst. In this case, since a DRS design in LTE specification is based on transmission of a full subframe(s), enhancement is needed and multiple alternatives may be envisioned.

In some embodiments, a DRS transmission may be dropped if a subframe where a DRS is scheduled is concurrent with a partial subframe of a downlink data burst. This may be beneficial in the case where the UE(s) receiving the DRS are expecting a full-subframe DRS transmission only in the subframes configured by the DRS measurement configuration.

In some embodiments, a DRS transmission may be shifted to an adjacent full-subframe if the subframe where the DRS is scheduled is concurrent with a partial subframe of a downlink data burst. This may be beneficial in the case where the UE(s) attempting to receive the DRS are expecting a full-subframe DRS transmission and may have multiple candidate subframes for detecting the DRS that include the adjacent subframe to the one containing the partial subframe of the downlink data burst. In one example, if the adjacent subframe (before or after) is still located within the DMTC, a UE attempting to receive the DRS will still consider those subframes as valid potential DRS transmission candidate subframes. In another example, a shift of the DRS subframe at time t may be to a subsequent subframe t+1 if the partial subframe is the initial subframe of the downlink data burst. In yet another example, a shift of the DRS subframe at time t may be to a previous subframe t−1 if the partial subframe is the last subframe of the downlink data burst.

In some embodiments, a DRS transmission may be modified from a full-subframe transmission structure to accommodate a partial subframe structure of a downlink data burst when the subframe where the DRS is scheduled is concurrent with the partial subframe of the downlink data burst. This is beneficial to avoid the need for UE(s) attempting to receive the DRS to need additional timing indication or detection of the DRS transmission other than the existing DRS measurement configuration and allow UEs which were already receiving the partial subframe for data or synchronization, or other purposes the additionally utilize the DRS multiplexed in the partial subframe of cell detection and RRM measurement. In one example, the partial subframe structure of FIG. 22 and/or FIG. 23 may be applied for cell detection and RRM measurement by utilizing the shifted PSS/SSS/CRS/CSI-RS locations as a valid DRS occasion. In another example, UEs may be able to detect (autonomously or based on assistance information or configuration) the partial subframe structure and determine the appropriate locations of the DRS multiplexed in the partial subframe and are therefore able to perform cell detection/RRM based on the DRS multiplexed in the partial subframe. In yet another example, the UE may detect the presence and structure of the DRS multiplexed in a partial subframe by autonomous detection of the PSS/SSS in one or more specified candidate subframe+symbol locations. In yet another example, the potential location of DRS locations multiplexed in a partial subframe may be indicated or configured for higher layers (e.g. RRC).

Figure 27:
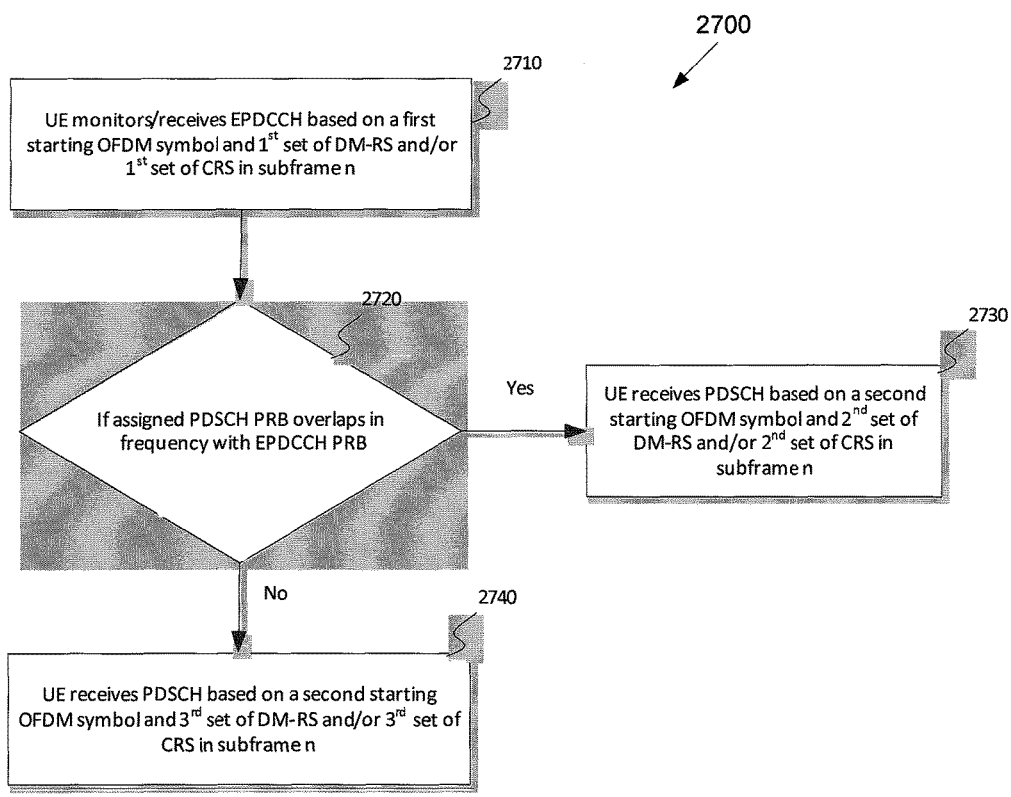
FIG. 27 illustrates another flowchart of explicit signaling method for determining an EPDCCH/PDSCH starting symbol according to embodiments of the present disclosure.

FIG. 27 illustrates another flowchart of explicit signaling method for determining an EPDCCH/PDSCH starting symbol according to embodiments of the present disclosure. The flowchart of the explicit signaling method 2700 shown in FIG. 27 is for illustration only. Other embodiments can be used without departing from the scope of the present disclosure.

As illustrated in FIG. 27, the signaling method 2700 begins at step 2710. At step 2710, a UE monitors and receives EPDCCH based on a first starting OFDM symbol and a first set of DM-RS and/or a first set of CRS in a subframe n. Subsequently, the UE performs step 2730 if assigned PDSCH PRB overlaps on frequency with EPDCCH PRB. If not, the UE performs step 2740. At step 2730 UE receives PDSCH based on a second starting OFDM symbols and a second set of DM-RS and/or a second set of CRS in a subframe n. At step, 2740, the UE receives PDSCH based on a second starting OFDM symbol and a third set of DM-RS and/or a third set of CRS in a subframe n.

There is a need to define the time-frequency resources for an LAA broadcast channel, hereafter referred to as an unlicensed-physical broadcasting channel (U-PBCH). The U-PBCH can be used to carry system or control information about a network or a cell transmitting the U-PBCH, including at least one or more of PLMN ID(s), LBT parameters, an LAA frame structure, or LAA cell system bandwidth, etc. The U-PBCH can be multiplexed in the same or subset of discovery reference signal (DRS) time resource. It is advantageous that U-PBCH frequency resources may span at least a minimum bandwidth (e.g. 4-5 MHz) from the standpoint of meeting regulatory requirements for occupied channel bandwidth (e.g., as specified in ETSI EN 301 893).

However, when a TBS of U-PBCH is not large (e.g. 10s of bits), transmitting a U-PBCH in an only a subset of PRBs of the minimum bandwidth can save power for a base station, reduce interference for neighboring receiver nodes, without sacrificing significant system performance. When there are multiple possible system bandwidths for an LAA cell, it is also advantageous that U-PBCH transmitted by the cell can be received or decoded without knowing the system bandwidth of the cell. In addition, it can be advantageous to support soft combining of U-PBCH over time at the receiver for time diversity and coverage enhancement.

In some embodiments, a fixed or predetermined set of frequency resources for U-PBCH are defined, independent of the LAA cell system bandwidth. The fixed set of contiguous frequency resources can span a bandwidth (e.g., U-PBCH BW) that is equal or less than the minimum supported LAA cell DL system bandwidth. The U-PBCH BW can be located at the center of the DL system bandwidth. A contiguous frequency resource can be a PRB (e.g., 12 subcarriers), or a sub-PRB (e.g. 6 subcarriers) (may include other signals or physical channel that may be multiplexed together). The set of U-PBCH contiguous frequency resources can be distributed over the U-PBCH BW. The U-PBCH can be multiplexed in the same set or a subset of subframes transmitted with PSS or SSS or DRS, where U-PBCH can occupy all or subset of available resources in the time domain of a PRB.

In one example, when the minimum LAA cell DL system bandwidth is 25 PRBs (5 MHz), and assuming six PRBs are used for U-PBCH, the resource element indices in frequency domain can be given by:

$$k = \frac{N_{RB}^{DL} N_{sc}^{RB}}{2} + RBO \times N_{sc}^{RB} + k', k' = 0, 1, \ldots, 11; RBO = -12, -8, -4, +3, +7, +11 \quad \text{Equation (1)}$$

where $N_{sc}^{RB}$ is the resource block size in the frequency domain, expressed as a number of subcarriers (e.g. 12), and $N_{RB}^{DL}$ is the downlink bandwidth configuration, expressed in multiples of $N_{sc}^{RB}$.

Figure 28:
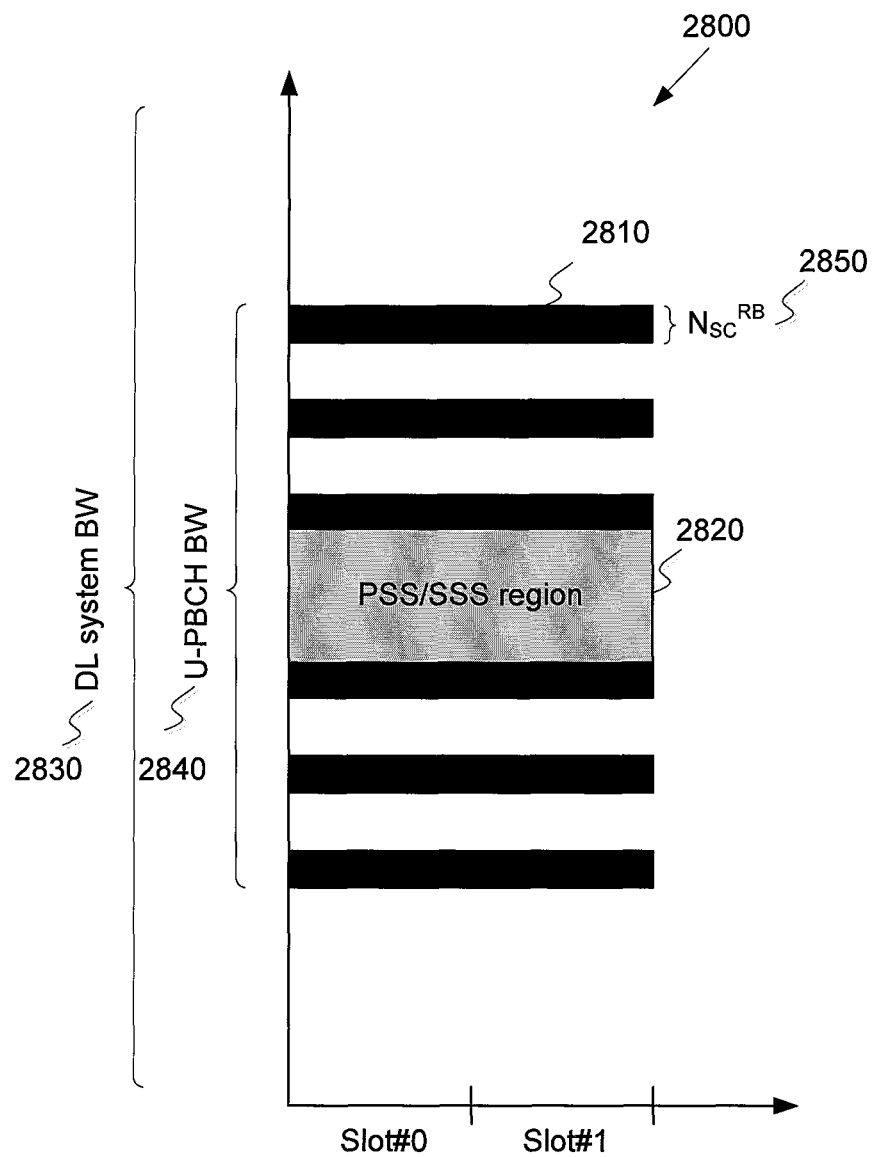
FIG. 28 illustrates an example unlicensed-physical broadcasting channel physical resource blocks (U-PBCH PRBs) mapping according to the first approach according to embodiments of the present disclosure.

FIG. 28 illustrates an example U-PBCH PRBs mapping according to the first approach according to embodiments of the present disclosure. An embodiment of the U-PBCH PRBs mapping 2800 shown in FIG. 28 is for illustration only. Other embodiments can be used without departing from the scope of the present disclosure.

The resource elements reserved for reference signals can be excluded. The reference signals can include one or more of the PSS, the SSS, the CRS and the CSI-RS (or DRS). With equation (1), the energy of U-PBCH is spread approximately uniformly over the bandwidth region not spanned by the PSS or the SSS as illustrated FIG. 28.

The U-PBCH PRB boundary may not be aligned with the conventional (e.g., PDSCH PRB boundary as specified in LTE specification) as can be the case for the mapping according to equation (1) when the DL system bandwidth that comprises of odd number of PRBs (when the DL system bandwidth comprises of even number of PRBs, the U-PBCH PRB boundary can be aligned with the conventional PDSCH PRB boundary). In one example, assuming 6 PRBs for U-PBCH, the resource element indices in frequency domain can be given by:

$$k = \frac{N_{RB}^{DL} N_{sc}^{RB}}{2} + RBO \times N_{sc}^{RB} + k', k' = 0, 1, \ldots, 11; RBO = -12, -9, -6, +5, +8, +11 \quad \text{Equation (2)}$$

In another example with different minimum LAA cell DL system bandwidth and different number of fixed PRBs for U-PBCH can be constructed.

As illustrated in FIG. 28, U-PBCH resource blocks 2810, each with size $N_{sc}^{RB}$ 2850, are distributed in a U-PBCH BW 2840 not overlapping with the frequency region mapped with PSS/SSS 2820. Note that only a subset of OFDM symbols in the PSS/SSS region may be mapped with PSS/SSS signals. The U-PBCH BW 2840 is located at the center of the DL system bandwidth 2830.

When a U-PBCH PRB overlaps with the PSS and the SSS, the U-PBCH REs can be rate matched around the PSS and the SSS. One example where the U-PBCH PRB can overlap with the PSS and the SSS is given by:

$$k = \frac{N_{RB}^{DL} N_{sc}^{RB}}{2} + RBO \times N_{sc}^{RB} + k', k' = 0, 1,$$ Equation (3)

$$..., 11; RBO = -13, -8, -3, +2, +7, +12$$

The resource elements reserved for reference signals (one or more of the PSS, the SSS, the CRS and the CSI-RS (or DRS)) can be excluded. In such example, the U-PBCH BW spans 26 PRBs. The U-PBCH PRBs that overlap with PSS and SSS in frequency correspond to RBO=−3 and +2. In yet another example, assuming 6 PRBs for U-PBCH, the resource element indices in frequency domain can be given by:

$$k = \frac{N_{RB}^{DL} N_{sc}^{RB}}{2} + RBO \times N_{sc}^{RB} + k', k' = 0, 1,$$ Equation (4A)

$$..., 11; RBO = -11, -7, -3, +2, +6, +10$$

where the U-PBCH BW spans 22 PRBs (~4 MHz).

Figure 29:
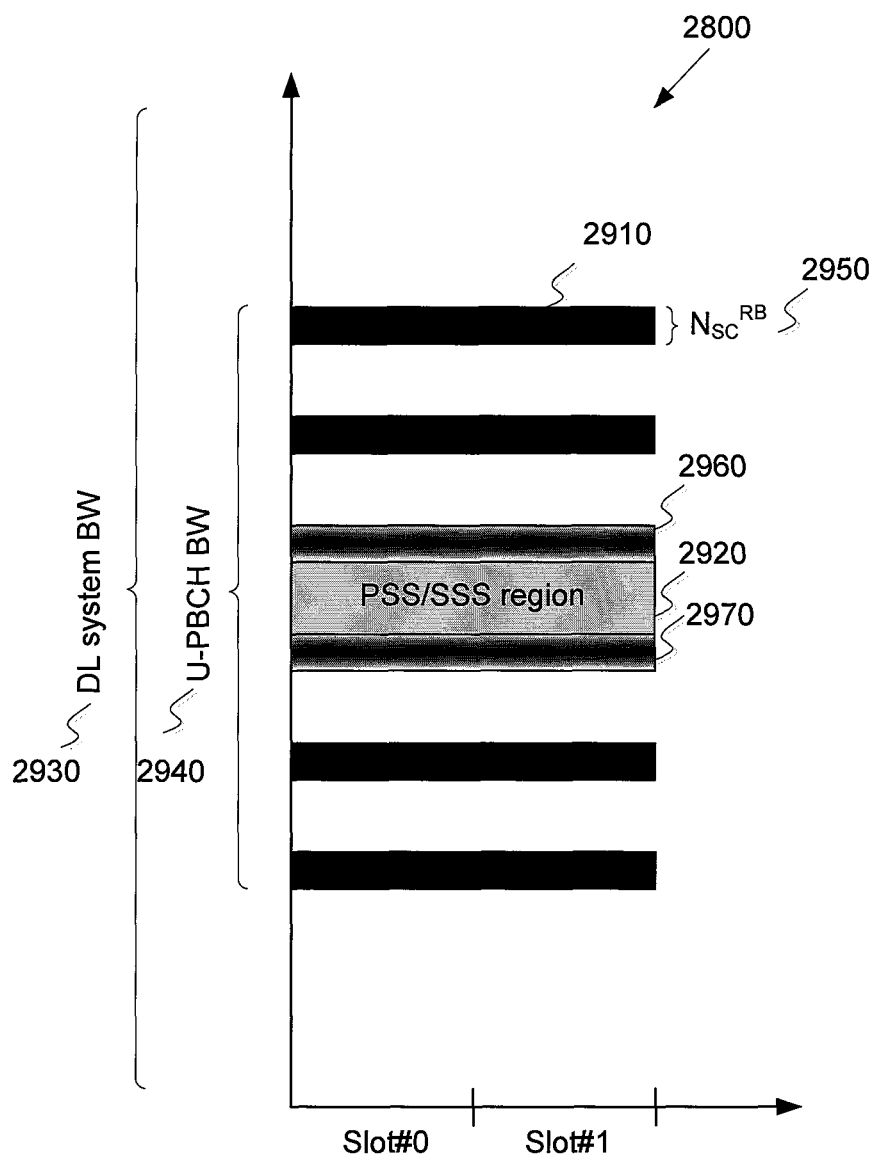
FIG. 29 illustrates another example U-PBCH PRBs mapping according to the first approach according to embodiments of the present disclosure.

FIG. 29 illustrates another example U-PBCH PRBs mapping according to the first approach according to embodiments of the present disclosure. An embodiment of the U-PBCH PRBs mapping 2900 shown in FIG. 29 is for illustration only. Other embodiments can be used without departing from the scope of the present disclosure.

As illustrated in FIG. 29, the case where part of the U-PBCH PRBs overlaps with PSS and SSS in frequency. The U-PBCH REs are rate matched around the PSS and the SSS REs in PRBs 2960 and 2970.

A U-PBCH contiguous frequency resources can also be more than $N_{sc}^{RB}$ (e.g. a multiple of $N_{sc}^{RB}$). When U-PBCH can share the same subframe with other PDSCH transmission, it can be beneficial for a U-PBCH contiguous time and frequency resource to be compatible with PDSCH resource allocation methods, such that U-PBCH and PDSCH can be multiplexed efficiently in the same subframe. For example, U-PBCH contiguous time and frequency resource can be one or multiple of resource block groups (RBG) defined for PDSCH resource allocation as specified in LTE specification. In one example, assuming RBG of size 4 and 8 PRBs for U-PBCH, the U-PBCH resource element indices in frequency domain can be given by:

$$k = \frac{N_{RB}^{DL} N_{sc}^{RB}}{2} + RBO \times N_{sc}^{RB} + k', k' = 0, 1, ..., 11;$$ Equation (4B)

$$RBO = -12, -11, -10, -9, +8, +9, +10, +11$$

The equations for the other RBG values (1, 2, and 3) can be constructed easily and are omitted. The resource elements reserved for reference signals (one or more of the PSS, the SSS, the CRS and the CSI-RS (or DRS)) can be excluded.

Figure 30:
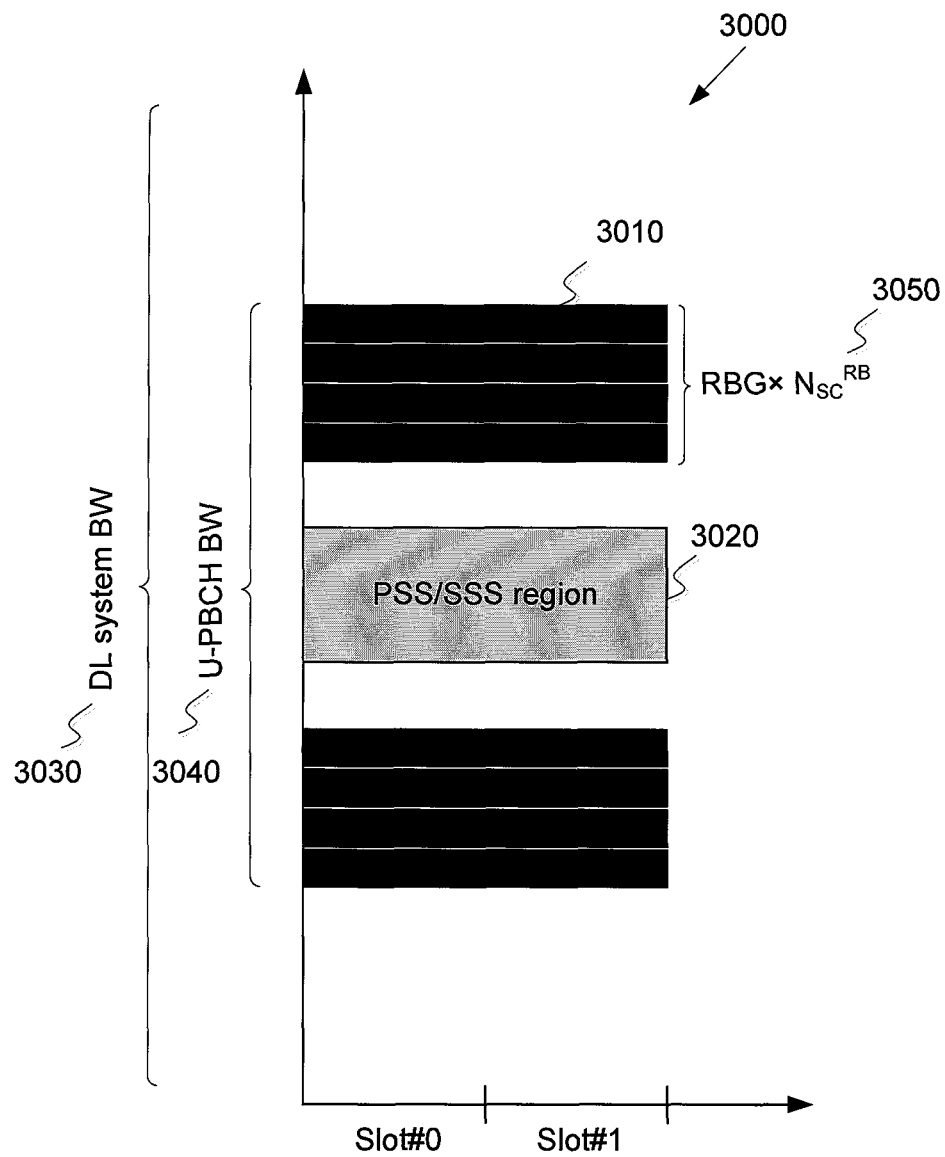
FIG. 30 illustrates an example yet another U-PBCH PRBs mapping according to the first approach according to embodiments of the present disclosure.

FIG. 30 illustrates an example yet another U-PBCH PRBs mapping according to the first approach according to embodiments of the present disclosure. An embodiment of the U-PBCH PRBs mapping 3000 shown in FIG. 30 is for illustration only. Other embodiments can be used without departing from the scope of the present disclosure.

Figure 31:
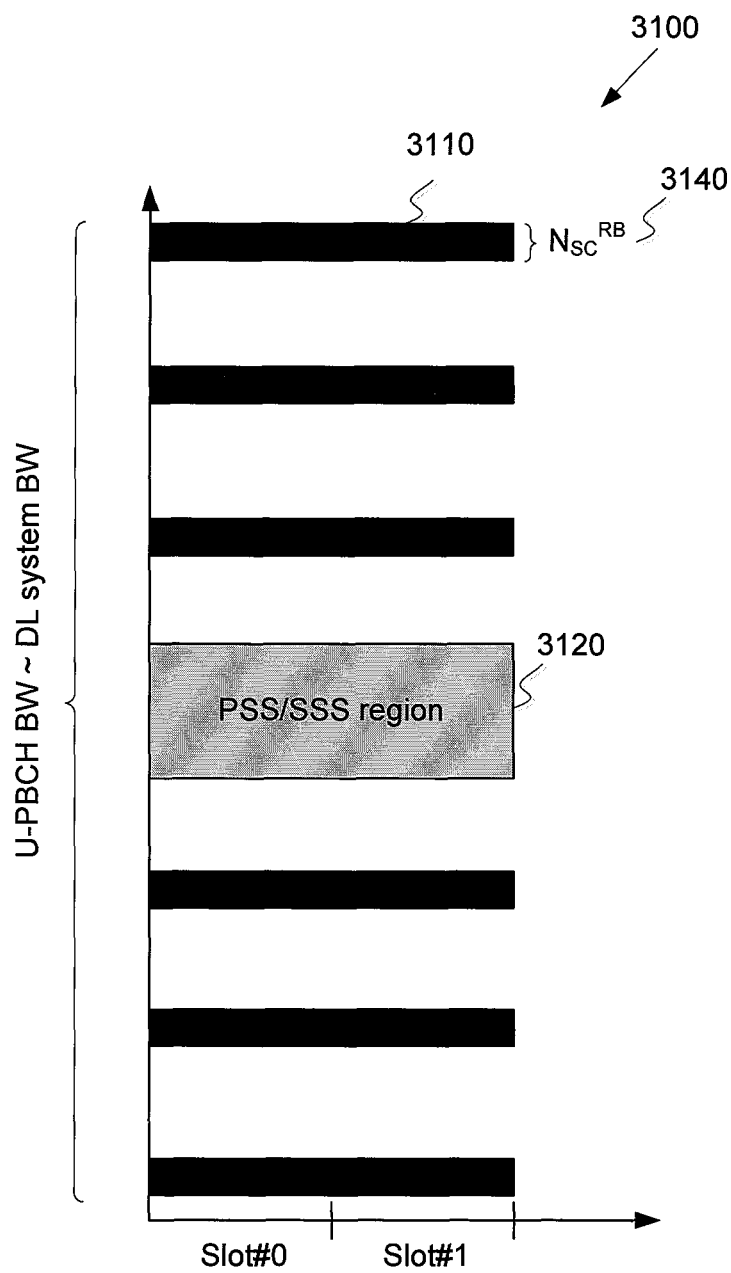
FIG. 31 illustrates an example U-PBCH PRBs mapping according to the second approach according to embodiments of the present disclosure.

FIG. 31 illustrates an example U-PBCH PRBs mapping according to the second approach according to embodiments of the present disclosure. An embodiment of the U-PBCH PRBs mapping 3100 shown in FIG. 31 is for illustration only. Other embodiments can be used without departing from the scope of the present disclosure.

As illustrated in FIG. 31, a contiguous U-PBCH frequency resource 3110 is defined as $RBG \times N_{sc}^{RB}$ 3150. To avoid the need for a U-PBCH receiver to perform hypothesis testing about the DL system bandwidth or to perform blind detection of the DL system bandwidth, the RBG for U-PBCH can be a constant regardless of the actual DL system bandwidth (e.g. 2 or 4).

In some embodiments, a fixed or predetermined set of frequency resources for U-PBCH are defined, and the frequency resource allocation is a function of the LAA cell system bandwidth. In one example, the fixed set of contiguous frequency resources can span a bandwidth (U-PBCH BW) which is the same (or approximately the same) as the LAA cell DL system bandwidth. A contiguous frequency resource can be a PRB (12 subcarriers), or a sub-PRB (e.g. 6 subcarriers) (may include other signals or physical channel that may be multiplexed together). The set of U-PBCH contiguous frequency resources can be distributed over the U-PBCH BW. The U-PBCH can be multiplexed in the same set or a subset of subframes transmitted with PSS or SSS or DRS, where U-PBCH can occupy all or subset of available resources in the time domain of a PRB. In another example, assuming six PRBs are used for U-PBCH, the resource element indices in frequency domain can be given by:

$$k = \frac{N_{RB}^{DL} N_{sc}^{RB}}{2} + RBO \times N_{sc}^{RB} + k', k' = 0, 1, ...,$$ Equation (5)

$$11; RBO = -13\alpha, -8\alpha, -3\alpha, +2\alpha, +7\alpha, +12\alpha$$

$$\alpha = \begin{cases} 1, \text{ for } 5 \text{ MHz} \\ 2, \text{ for } 10 \text{ MHz} \\ 3, \text{ for } 15 \text{ MHz} \\ 4, \text{ for } 20 \text{ MHz} \end{cases}$$

Another example of equation can be given by:

$$k = \frac{N_{RB}^{DL} N_{sc}^{RB}}{2} + RBO \times N_{sc}^{RB} + k', k' = 0, 1, ..., 11;$$ Equation (6)

where the range of RBO depends on the DL system bandwidth given in TABLE 3.

The resource elements reserved for reference signals can be excluded. The reference signals can include one or more of the PSS, the SSS, the CRS and the CSI-RS (or DRS).

TABLE 3

| DL BW | RBO |
|---|---|
| 5 MHz | −12, −8, −4, +3, +7, +11 |
| 10 MHz | −24, −16, −8, +8, +16, +24 |
| 15 MHz | −36, −24, −12, +12, +24, +36 |
| 20 MHz | −48, −32, −16, +16, +32, +48 |

Other values of α and RBO are possible without departing from the principles of the invention.

The U-PBCH of multiple neighboring cells transmitting on the same frequency can potentially collide in the same time-frequency resources. The U-PBCH information bits can be scrambled with cell-specific property such as the PCID to mitigate inter-cell interference. Nevertheless, it can be beneficial to improve coverage of U-PBCH if additional inter-cell interference avoidance/mitigation/randomization scheme is applied to U-PBCH transmission.

In some embodiments, a frequency offset (e.g. in PRB) that can be a function of cell-specific property (such as PCID) can be applied to U-PBCH PRBs such that the collision of U-PBCH resources of neighboring cells in time and frequency can be reduced or even avoided with careful cell planning. In one example, assuming the first approach and assuming 6 PRBs for U-PBCH, the U-PBCH resource element indices in frequency domain can be given by:

$$k = \frac{N_{RB}^{DL} N_{sc}^{RB}}{2} + RBO \times N_{sc}^{RB} + k', k' = 0, 1, \ldots, 11;$$

$$RBO = -12 + o, -8 + o, -4 + o, o, 4 + o, 8 + o;$$

$$o = PCID \bmod 4$$

Equation (7)

Figure 32:
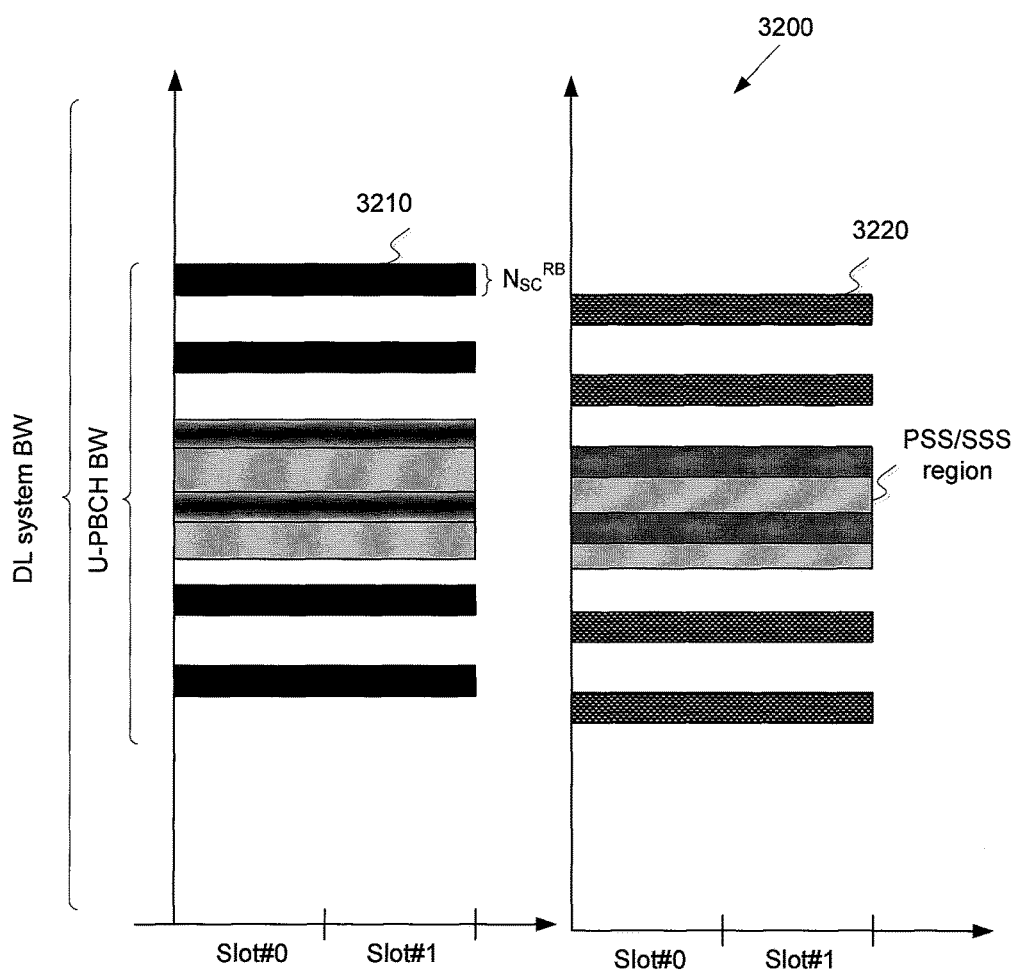
FIG. 32 illustrates an example U-PBCH collision avoidance/mitigation through frequency offset according to embodiments of the present disclosure.

FIG. 32 illustrates an example U-PBCH collision avoidance/mitigation through frequency offset according to embodiments of the present disclosure. An embodiment of the U-PBCH collision avoidance/mitigation 3200 shown in FIG. 32 is for illustration only. Other embodiments can be used without departing from the scope of the present disclosure.

The resource elements reserved for reference signals can be excluded. The reference signals can include one or more of the PSS, the SSS, the CRS and the CSI-RS (or DRS). As illustrated in FIG. 32, the frequency resources of U-PBCH for two cells are shown. The first cell's U-PBCH 3210 assumes an o value of 0 (PCID of cell 1 mod 4=0) and the second cell's U-PBCH 3220 assumes an o value of 1 (PCID of cell 2 mod 4=0). According to equation (7), the U-PBCH resources of cell 1 and cell 2 do not overlap in frequency, thus avoiding interference to each other.

In some embodiments, a frequency resource location of U-PBCH can also change over time (e.g. for every transmission instance, or for every subframe, or for every slot). In one example, assuming the first approach and assuming 6 PRBs for U-PBCH, the U-PBCH resource element indices in frequency domain can be given by:

$$k = \frac{N_{RB}^{DL} N_{sc}^{RB}}{2} + RBO \times N_{sc}^{RB} + k', k' = 0, 1, \ldots, 11;$$

$$RBO = -12 + o, -8 + o, -4 + o, o, 4 + o, 8 + o;$$

$$o = (PCID + SF) \bmod 4$$

Equation (8)

where SF is the subframe index of the U-PBCH.

The subframe index can be indicated with one or multiple signals from the DRS (e.g. CRS). SF can also be replaced with slot index (within a frame), in which case there can be a frequency offset between the U-PBCH resource in the first and the second slot of a subframe.

In another example, other equivalent or similar equations to equation (1) to equation (8) can be constructed without departing from the principles of the aforementioned embodiments.

When the U-PBCH resource locations are dependent on the DL system bandwidth, the aforementioned embodiments based on equation (5) or (6), or equation (4), where the RBG value can be 1, 2, 3 or 4, depends on the DL system bandwidth as illustrated in FIG. 30. Therefore, there is a need for the U-PBCH receiver to determine the DL system bandwidth to receive/decode U-PBCH correctly.

The DL system bandwidth can be known at the U-PBCH receiver (e.g. UE) if it is detecting the U-PBCH of a serving cell and the DL bandwidth of the serving cell has been indicated to the receiver beforehand (e.g. via RRC signaling or higher layer signaling), or if the U-PBCH has been detected in the past. For detection of U-PBCH of a neighboring cell, the DL system bandwidth of the neighboring cell can be informed to the serving cell through network coordination or operation, administration and management (OAM), which is then signaled to the UE or U-PBCH receiver.

However, the U-PBCH receiver may not know the DL system bandwidth. For example, it is attempting to detect U-PBCH of a non-serving cell for the first time without informing the DL system bandwidth beforehand. In such example, the U-PBCH receiver can attempt to detect U-PBCH assuming a hypothetical DL system bandwidth. If U-PBCH decoding is unsuccessful, different DL system bandwidth assumptions may be tried. Successful U-PBCH decoding (e.g. U-PBCH CRC is passed) implies that the DL system bandwidth assumed was correct. Multiple hypothesis testing can also be conducted in parallel. The U-PBCH receiver can also rely on blind detection of other signals such as CRS or DRS to determine the DL system bandwidth as the bandwidth of those signals depends on the DL system bandwidth.

In some embodiments, the DL system bandwidth can be indicated by CRS of the DRS. In one example, the CRS sequence generation can be performed according to LTE specification but the initialization of the pseudo-random sequence generator can be modified such that it is at least a function of the DL system bandwidth. One example can be given by:

$$c_{init} = 2^{12} \cdot BW + 2^{10} \cdot (7 \cdot (n_s + 1) + l + 1) \cdot (2 \cdot N_{ID}^{cell} + 1) + 2 \cdot N_{ID}^{cell} + N_{CP}$$

Equation (9A)

where the value BW can depend on the DL system bandwidth, e.g. BW=0, 1, 2, 3 for 5 MHz, 10 MHz, 15 MHz, 20 MHz, respectively. The U-PBCH receiver can try, either in serial or in parallel, different assumptions of BW value in CRS detection.

In some embodiments, when there can be multiple CRS ports (e.g. port 0 and port 1) transmitted in the subframe with U-PBCH, only a subset (e.g. one) of the CRS port sequence generation can be a function of the DL system bandwidth. In one example, CRS sequence for port 0 is not a function of the DL system bandwidth (e.g. as specified in LTE specification). In another example, a CRS sequence for port 1 is at least a function of the DL system bandwidth as expressed by equation (9). Multiple CRS ports can be present (e.g. when U-PBCH utilizes transmit diversity transmission scheme (e.g. SFBC based on CRS port 0 and port 1 as specified in LTE specification).

Figure 33:
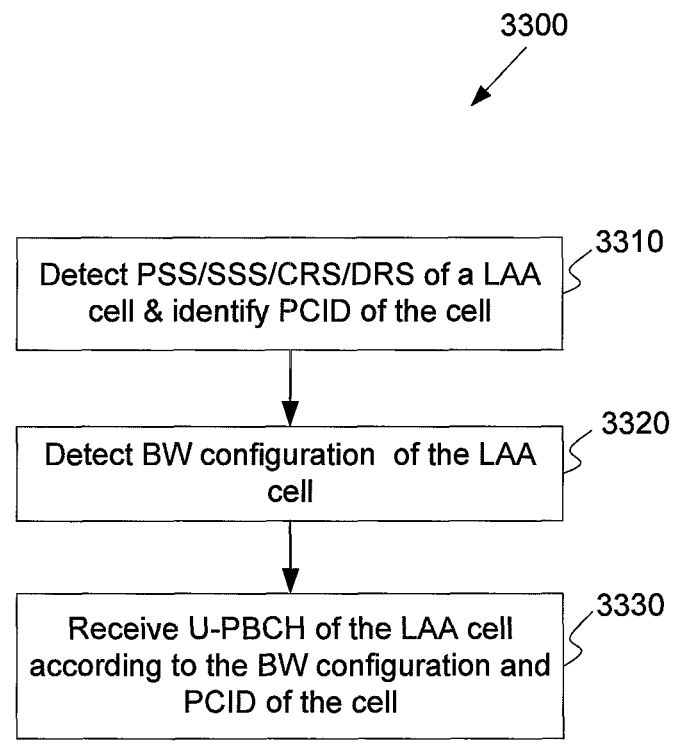
FIG. 33 illustrates a flowchart of U-PBCH detection method according to embodiments of the present disclosure.

FIG. 33 illustrates a flowchart of U-PBCH detection method according to embodiments of the present disclosure. An embodiment of the U-PBCH detection method 3300 shown in FIG. 33 is for illustration only. Other embodiments can be used without departing from the scope of the present disclosure.

As illustrated in FIG. 33, a method of U-PBCH detection is performed when the U-PBCH is required to detect the DL bandwidth configuration of the cell before receiving the U-PBCH. At step 3310, the U-PBCH receiver attempts to detect the PSS/SSS/CRS/DRS of an LAA cell and identify the PCID of the cell. Subsequently, the U-PBCH receiver tries to detect the DL bandwidth configuration of the detected LAA cell at step 3320. Finally, the U-PBCH can receive, at step 3330, the U-PBCH of the LAA cell according to the detected bandwidth configuration and PCID of the cell.

The time period between subsequent transmissions on U-PBCH may be known at the UE and may be configurable to provide flexibility for a network operator. In some embodiments, if the DRS is transmitted together with the U-PBCH, the U-PBCH transmission period is a multiple of the configured DRS transmission period (e.g. DMTC). In one example, the U-PBCH period may be configured with a parameter such as u-pbchPeriod, where u-pbchPeriod takes a value from the range of possible values for the DMTC (e.g. the same range as dmtcPeriod). In another example, U-PBCH timing may be configured with an integer multiple u-pbchPeriodmultiple of the configured DMTC period (e.g. u-pbchPeriod=u-pbchPeriodmultiple×dmtcPeriod).

In order to reduce the U-PBCH reception burden at the UE, a U-PBCH modification period can also be configured and signaled, where the UE does not expect the U-PBCH message contents to change over the course of the modification period. In some embodiments of a fixed modification period, an upcoming change to the U-PBCH can be indicated by a change notification, wherein the U-PBCH or a separate control channel (e.g., a paging channel) indicates when the modified U-PBCH will be transmitted.

The value(s) for configuring the U-PBCH period may be indicated according to multiple methods, for example, as part of the system information provided on the PCell or other serving cells, or as part of the unlicensed SCell configuration via RRC messages, or as part of the U-PBCH message. In one example such as that the U-PBCH provides the indication of the transmission timing, the UE may initially blindly detect the presence of the U-PBCH after possibly first detecting the presence of DRS, and after decoding the U-PBCH, apply the indicated U-PBCH period to subsequent reception attempts.

A cell-specific timing offset between U-PBCH periods of different cells may be beneficial for interference coordination as well. The timing offset may be coordinated (e.g. OAM) or be a function of PCID and PLMN ID.

Figure 34:
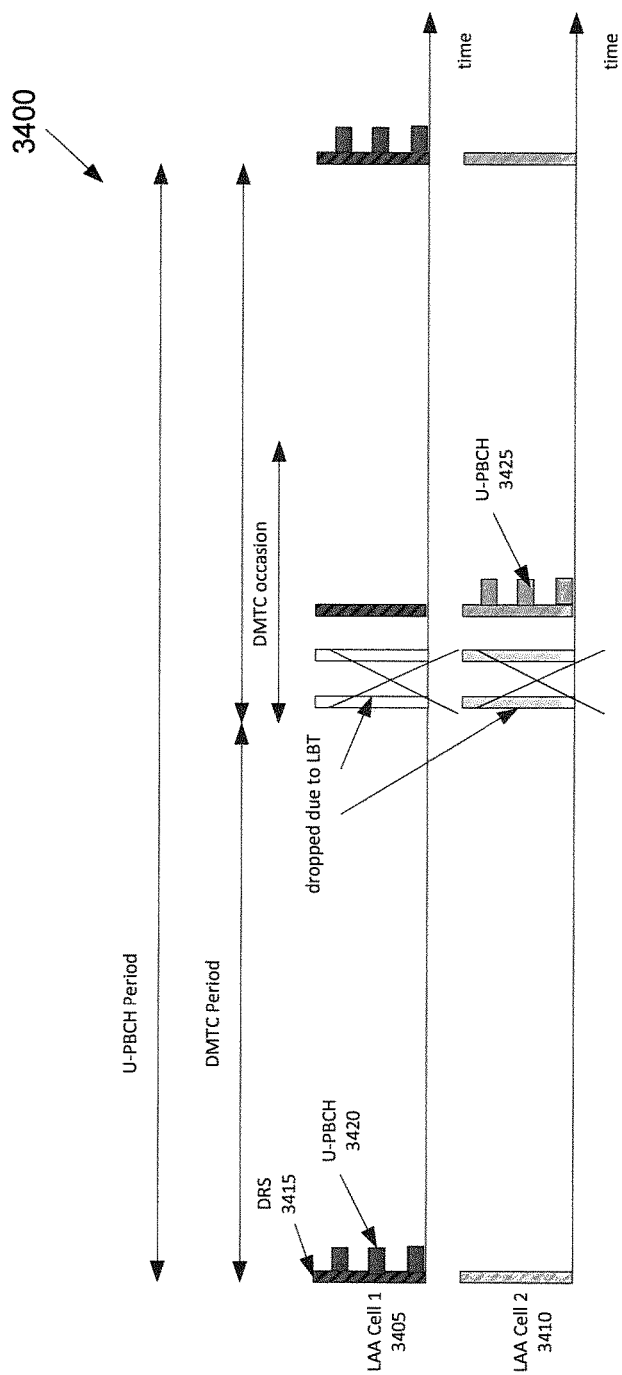
FIG. 34 illustrates an example U-PBCH timing configuration according to embodiments of the present disclosure.

FIG. 34 illustrates an example U-PBCH timing configuration according to embodiments of the present disclosure. An embodiment of the U-PBCH timing configuration 3400 shown in FIG. 34 is for illustration only. Other embodiments can be used without departing from the scope of the present disclosure.

As illustrated in FIG. 34, an offset of one DMTC period is configured between two LAA cells 3405, 3410 with a U-PBCH periods 3420, 3425 that is twice the configured DMTC period. Based on functions of one or more of the U-PBCH period, DMTC period, and PCID/PLMN IDs, U-PBCH offset may be calculated by:

$$uPBCH\_offset=(PCID)\bmod(upbchPeriod/dmtcPeriod) \quad \text{Equation (9B)}$$

$$uPBCH\_offset=(PLMN\_ID)\bmod(upbchPeriod/dmtcPeriod) \quad \text{Equation (10)}$$

$$uPBCH\_offset=(PCID+PLMN\_ID)\bmod(upbchPeriod/dmtcPeriod) \quad \text{Equation (11)}$$

In order to support RRM measurement on one or more unlicensed carriers, a UE may be configured to report RSRP, RSSI, and possibly RSRQ (e.g. a combination of RSRP/RSSI) measurement quantities. A UE may be configured to make these measurement quantities during one or more DMTC/DRS occasions (e.g. one-shot measurement), or may average across multiple occasions. Since these measurements are useful for the network in performing channel selection and load-balancing, it is important to provide an unambiguous measurement quantity which accurately reflects the current interference situation.

However as discussed in the aforementioned embodiments, cells may transmit U-PBCH multiplexed with DRS in different time/frequency resources depending on a network configuration. As a result, RSSI measurement that potentially includes U-PBCH resources may result in measurement variations or an artificially biased measurement quantity that the network may interpret as indicating detected interference from a cell that may otherwise be dormant other than DRS/U-PBCH transmissions.

As a result, different solutions for RSSI measurement considering U-PBCH transmissions may be envisioned. In some embodiments, the RSSI measurement may include the full bandwidth of a subframe containing U-PBCH. Although the resources containing U-PBCH are included the network may attempt to compensate for any bias by performing averaging or filtering of measurements over multiple subframes within a DRS/DMTC occasion, or across multiple DRS/DMTC occasions.

In some embodiments, the RSSI measurement definition may exclude the potential resources used for U-PBCH transmissions. For example RSSI measurement on an unlicensed carrier may be performed on all OFDM symbols of the indicated measurement subframes except for the symbols (or the slots, or the subframes) containing resources for U-PBCH.

The application of the aforementioned embodiments at the UE may be indicated by higher-layer signaling. In addition, if a UE is able to detect the presence of U-PBCH of a serving or neighboring cell, the UE may remove those symbols containing U-PBCH from the otherwise full-bandwidth measurement, or subtract the estimated energy from the reported RSSI measurement quantity.

It can be beneficial for an LAA base station to broadcast its PLMN ID(s), e.g. to enable network coordination for interference management, and/or inter-operator co-existence management. In some embodiments, PLMN ID(s) are transmitted in U-PBCH or other broadcast channel of the LAA cell. A UE can be requested by the eNodeB to read the PLMN ID(s) of a cell. The target cell for PLMD ID(s) reporting can be indicated using the PCID of the cell. When only the MNC needs to be broadcast by the cell, e.g. because the MCC can be assumed the same as that for the UE's serving cell, the LAA broadcast channel can include the MNC information without the MCC information.

In some embodiments, the PLMN ID(s) of an LAA cell can be carried by the PSS/SSS, or the CRS, or the CSI-RS, or the DRS. In one example, the LAA SSS sequence can be scrambled by the PLMN ID, comprising mobile country code (MCC) and mobile network code (MNC). When only the MNC needs to be broadcast by the cell, e.g. because the MCC can be assumed the same as that for the UE's serving cell, the LAA SSS sequence can include the MNC information without the MCC information, e.g. by scrambling the SSS sequence with MNC value.

When there are multiple SSS sequences transmitted in a DRS occasion, e.g. to improve PCID detection reliability, a subset of the SSS sequences can carry (or scrambled by) the PLMN ID information (and may not carry (or scrambled by) the physical-layer cell identity group), while the remaining SSS sequence(s) can still carry (or scrambled by) the physical-layer cell identity group. In one example, the LAA PSS and SSS sequences can jointly indicate the PLMN ID. When there are multiple PSSS and SSS sequences transmitted in a DRS occasion, e.g. to improve PCID detection reliability, a subset of the PSS and SSS sequences can carry the PLMN ID information (and may not carry the PCID information), while the remaining PSS and SSS sequences can still carry the PCID information.

In another example, when only the MNC needs to be broadcast by the cell, e.g. because the MCC can be assumed the same as that for the UE's serving cell, the LAA PSS and SSS sequences that carry the PLMN ID can include the MNC information without the MCC information. The MNC value carried can be one of 100 or 1000 values (e.g., as specified in LTE specification). When the maximum number of MNC values is 100, each value can be uniquely mapped to one value from 0 to 503, which is then used to replace the PCID that is used to determine the PSS and SSS sequences according to LTE specification. By the detecting the PSS and the SSS, the UE (or other receiver) can determine the PLMN ID. When the maximum number of MNC values is 1000, multiple MNC values can be mapped to one value from 0 to 503. If the PLMN ID of a cell detected doesn't map to the same value from 0 to 503 as that corresponding to the PLMN ID of the serving cell, the UE (or other receiver) can determine that the cell detected does not belong to the same operator.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle.

What is claimed is:

1. A user equipment (UE), the UE comprising:
   a transceiver configured to receive, from an eNodeB (eNB), an indication of a partial subframe configuration over an unlicensed spectrum in a licensed assisted access (LAA) cell; and
   at least one processor configured to:
   determine a resource element (RE) mapping rule based on the indication of the partial subframe configuration;
   identify an RE position of at least one reference signal to be received from the eNB based on the RE mapping rule;
   apply the RE mapping rule when the indication of the partial subframe configuration is received from the eNB; and
   apply a different RE mapping rule when the indication of the partial subframe configuration is not received from the eNB.

2. The UE of claim 1, wherein the at least one processor is further configured to identify a valid starting position of at least one orthogonal frequency division multiplexing (OFDM) symbol of a downlink transmission burst based on the indication of the partial subframe configuration.

3. The UE of claim 2, wherein the downlink transmission burst including the valid starting position of the at least one OFDM symbol that is configured by the indication of the partial subframe configuration comprises at least one of a physical downlink shared channel (PDSCH), an enhanced physical downlink control channel (EPDCCH), and a physical downlink control channel (PDCCH).

4. The UE of claim 1, wherein the at least one processor is further configured to determine a set of valid starting and ending positions of at least one OFDM symbol of a downlink transmission burst based on the indication of the partial subframe configuration.

5. The UE of claim 1, wherein the at least one processor is further configured to determine the RE position of the at least one reference signal based on a valid starting position of at least one OFDM symbol of a downlink transmission burst.

6. The UE of claim 1, when the indication of the partial subframe configuration is received from the eNB, the RE mapping rule comprises identifying the RE position of at least one reference signal based on a non-multicast broadcast single frequency network (non-MBSFN) subframe pattern for the partial subframe configuration regardless of whether MBSFN subframe is configured for the partial subframe configuration.

7. The UE of claim 1, wherein:
   the at least one reference signal comprises a common reference signal (CRS) that is configured by the indication of the partial subframe configuration, and
   the configured CRS is mapped in a non-MBSFN subframe.

8. An eNodeB (eNB), the eNB comprising:
   a transceiver configured to transmit, to a user equipment (UE), an indication of a partial subframe configuration over an unlicensed spectrum in a licensed assisted access (LAA) cell; and
   at least one processor configured to:
   when a resource element (RE) mapping rule is used based on the indication of the partial subframe configuration, configure an RE position of at least one reference signal to be transmitted to the UE based on the RE mapping rule;
   apply the RE mapping rule when the indication of the partial subframe configuration is transmitted to the UE; and
   apply a different RE mapping rule when the indication of the partial subframe configuration is not transmitted to the UE.

9. The eNB of claim 8, wherein the at least one processor is further configured to identify a valid starting position of at least one orthogonal frequency division multiplexing (OFDM) symbol of a downlink transmission burst based on the indication of the partial subframe configuration.

10. The eNB of claim 9, wherein the downlink transmission burst including the valid starting position of the at least one OFDM symbol that is configured by the indication of the partial subframe configuration comprises at least one of a physical downlink shared channel (PDSCH), an enhanced physical downlink control channel (EPDCCH), and a physical downlink control channel (PDCCH).

11. The eNB of claim 8, wherein the at least one processor is further configured to determine a set of valid starting and ending positions of at least one OFDM symbol of a downlink transmission burst based on the indication of the partial subframe configuration.

12. The eNB of claim 8, wherein the at least one processor is further configured to determine the RE position of the at least one reference signal based on a valid starting position of at least one OFDM symbol of a downlink transmission burst.

13. The eNB of claim 8, when the indication of the partial subframe configuration is transmitted to the UE, the RE mapping rule comprises at least one RE positions indicated based on a non-multicast broadcast single frequency network (non-MBSFN) subframe pattern for the partial subframe configuration regardless of whether MBSFN subframe is configured for the partial subframe configuration.

14. The eNB of claim 8, wherein:
   the at least one reference signal comprises a common reference signal (CRS) that is configured by the indication of the partial subframe configuration, and
   the configured CRS is mapped in a non-MBSFN subframe.

* * * * *